(12) United States Patent
Shimizu et al.

(10) Patent No.: US 7,841,961 B2
(45) Date of Patent: Nov. 30, 2010

(54) PLANETARY GEARSET

(75) Inventors: Takashi Shimizu, Toyota (JP); Hideto Watanabe, Toyota (JP); Hiroshi Hata, Susono (JP); Masahiro Kojima, Susono (JP); Hideaki Komada, Susono (JP); Masataka Sugiyama, Susono (JP); Kenji Odaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/337,698

(22) Filed: Dec. 18, 2008

(65) Prior Publication Data
US 2009/0105035 A1    Apr. 23, 2009

Related U.S. Application Data

(62) Division of application No. 10/500,852, filed as application No. PCT/IB03/00075 on Jan. 15, 2003, now Pat. No. 7,510,498.

(30) Foreign Application Priority Data

| Jan. 17, 2002 | (JP) | ............................ 2002-008988 |
| May 20, 2002 | (JP) | ............................ 2002-145348 |
| May 31, 2002 | (JP) | ............................ 2002-160204 |

(51) Int. Cl.
*F16H 57/08* (2006.01)
(52) U.S. Cl. .......................................... 475/331; 74/438
(58) Field of Classification Search ................. 475/331, 475/344; 74/438, 457, 460, 462
See application file for complete search history.

(56) References Cited

U.S. PATENT DOCUMENTS

| 433,394 | A | * | 7/1890 | Bleding ....................... 475/323 |
| 2,522,694 | A | * | 9/1950 | Vogel .......................... 74/498 |
| 2,964,977 | A | * | 12/1960 | Kopec ........................ 475/82 |
| 3,303,713 | A | | 2/1967 | Hicks |
| 3,421,390 | A | * | 1/1969 | Lohr .......................... 475/342 |
| 3,605,522 | A | | 9/1971 | Grosseau |
| 3,665,788 | A | * | 5/1972 | Nyman ........................ 475/72 |
| 3,771,622 | A | | 11/1973 | Hyakumura |
| 4,096,769 | A | * | 6/1978 | Horikiri et al. .............. 475/347 |

(Continued)

FOREIGN PATENT DOCUMENTS

EP        374463        6/1990

(Continued)

*Primary Examiner*—David D Le
*Assistant Examiner*—Derek D Knight
(74) *Attorney, Agent, or Firm*—Oblon, Spivak, McClelland, Maier & Neustadt, L.L.P.

(57) ABSTRACT

A planetary gearset provided with a sun gear, a ring gear, and a carrier that rotatably retains a plurality of pinion gears arranged between the sun gear and the ring gear as elements, in which one of the elements is made a fixed element and one of the other elements is made a rotating element, and which transmits torque between that rotating element and an external member provided in a location eccentric with respect to that rotating member. The planetary gearset is constructed such that the fixed element is movably retained in the direction of a load from the transmission of torque between the rotating element and the external member, and the load from the transmission of torque between the rotating element and the external member is received by a fixed portion that rotatably retains that rotating element.

18 Claims, 24 Drawing Sheets

U.S. PATENT DOCUMENTS

| | | | |
|---|---|---|---|
| 4,106,366 A | 8/1978 | Altenbokum et al. | |
| 4,136,580 A | 1/1979 | Brand et al. | |
| 4,315,440 A | 2/1982 | Chszaniecki | |
| 4,429,587 A | 2/1984 | Finn et al. | |
| 6,223,616 B1 | 5/2001 | Sheridan | |
| 6,223,858 B1 | 5/2001 | Ubagai et al. | |

FOREIGN PATENT DOCUMENTS

| | | |
|---|---|---|
| FR | 2173486 | 10/1973 |
| GB | 681298 | 10/1952 |
| GB | 1188863 A | 4/1970 |
| JP | 52-076871 U | 6/1977 |
| JP | 53-37883 | 4/1978 |
| JP | 55-173755 | 12/1980 |
| JP | 57-110359 | 7/1982 |
| JP | 59-208268 | 11/1984 |
| JP | 3-123148 | 12/1991 |
| JP | 4-175542 | 6/1992 |
| JP | 5-27413 | 4/1993 |
| JP | 5-155265 | 6/1993 |
| JP | 6-107010 | 4/1994 |
| JP | 6-213306 | 8/1994 |
| JP | 7-54973 | 2/1995 |
| JP | 7-217725 | 8/1995 |
| JP | 2001-182809 | 7/2001 |
| JP | 2001-227625 | 8/2001 |

* cited by examiner

F I G . 12
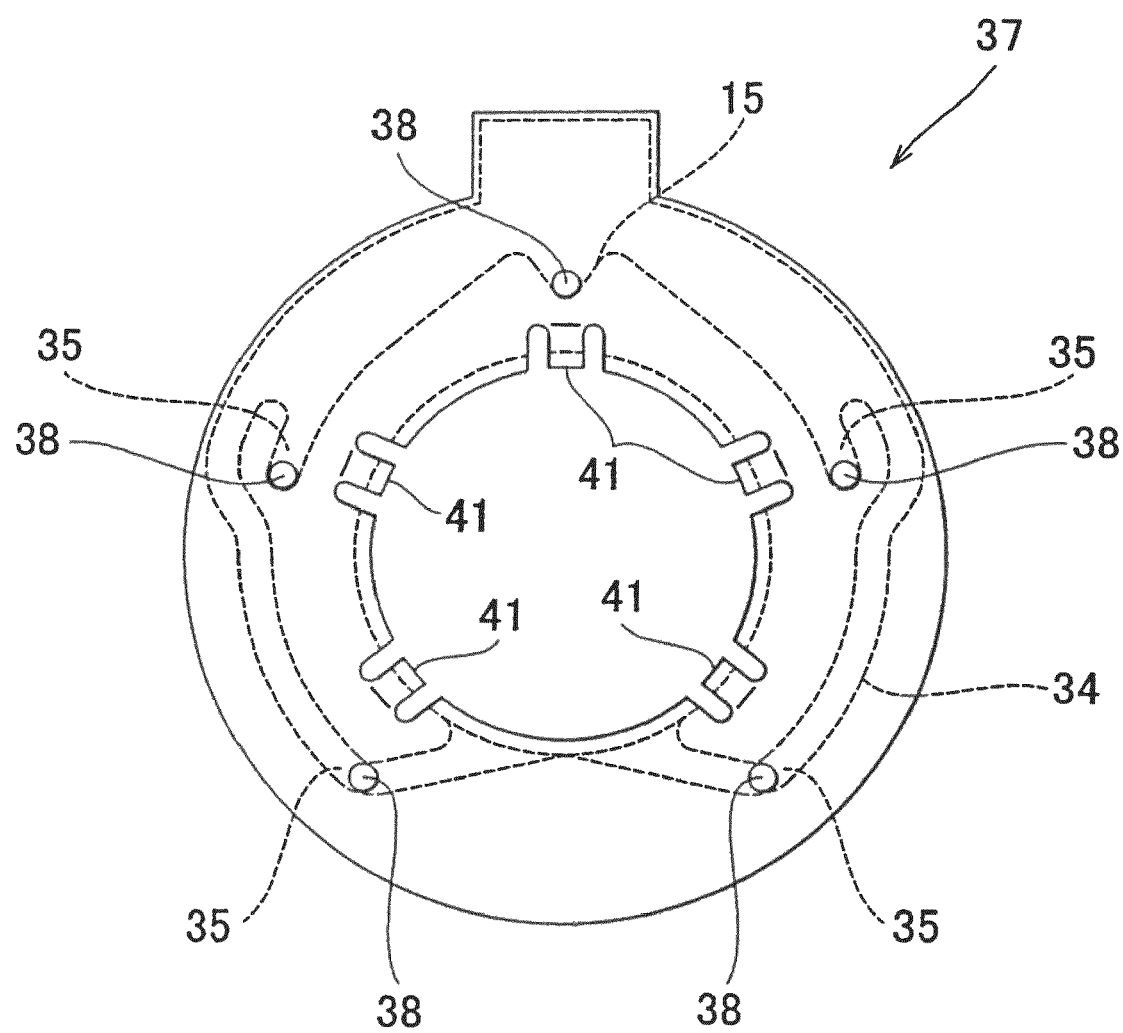

PLANETARY GEARSET

CROSS-REFERENCE TO RELATED APPLICATIONS

This application is a divisional of, and claims the benefit of priority under 35 U.S.C. §120 from, U.S. Ser. No. 11/500, 852, filed May 31, 2005, the entire contents of which are incorporated herein by reference. U.S. Ser. No. 11/500,852 is in turn a National Stage Entry of PCT/IB03/00075 filed on Jan. 15, 2003, and is based upon, and claims the benefit of priority under 35 U.S.C. §119 from, the Japanese Patent Applications No. 2002-160204, filed May 31, 2002, and No. 2002-145348, filed May 20, 2002, and No. 2002-008988, filed Jan. 17, 2002. The present application claims the benefit of priority to each of the above-noted applications.

BACKGROUND OF THE INVENTION

1. Field of the Invention

The invention relates to a planetary gearset, the main components of which are a sun gear, a ring gear, and a carrier that retains pinion gears (planet gears) arranged between the sun gear and the ring gear.

2. Description of the Related Art

Typically, a planetary gearset is a device in which a sun gear, which is a gear with external teeth, and a ring gear, which is a gear with internal teeth, are arranged on the same axis, with pinion gears arranged between the sun gear and the ring gear, which are retained by the carrier so as to be able to rotate and revolve. With respect to these pinion gears, a device provided with pinion gears that engage with both the sun gear and the ring gear at the same time has been known. In addition, a device provided with a first pinion gear that engages with the sun gear, and a second pinion gear that engages with the first pinion gear and the ring gear has also been known.

The former planetary gearset is commonly referred to as a single pinion type planetary gearset, while the latter planetary gearset is commonly referred to as a double pinion type planetary gearset. Moreover, a Ravigneaux type planetary gearset, in which a single pinion type planetary gearset is integrally combined with a double pinion type planetary gearset, has also generally been known.

A planetary gearset of this type of configuration has three main elements, which are a sun gear, a ring gear, and a carrier. The planetary gearset functions as a decelerating device, an accelerating device, and a reversing device and the like by making one of those elements an input element, another one an output element, and another one a fixed element. Coupling together any two of the elements integrates the entire planetary gearset.

Regardless of the mode of use, the pinion gears become the medium through which torque is transmitted between the sun gear and the ring gear. Accordingly, the more pinion gears there are, the more torque that can be transmitted between the sun gear and the ring gear. Therefore, the invention disclosed in Japanese Patent Laid-Open Publication No. 4-175542, for example, increases the number of pinion gears that can be retained by the carrier by changing the structure of the carrier.

In this publication it is disclosed that, assuming that the torque applied to each of the plurality of pinion gears is equal, when five instead of four pinion gears are provided, the torque able to be transmitted increases by 1.25 times. Depending on the mode of use of the planetary gearset, however, a large load may end up being applied to a specific pinion gear, thereby leading to a decrease in strength and durability of the planetary gearset.

More specifically, FIGS. 33 and 34 show an example of two pinion gears 3 arranged between a sun gear 1 and a ring gear 2, with a carrier 4 that retains those pinion gears 3 fixed by splines 6 to a casing 5. In addition, a counter gear 8 is engaged with external teeth 7 formed on an outer peripheral face of the ring gear 2. In addition, the ring gear 2 is supported by the casing 5 via a bearing 9 fitted at the outer periphery of the ring gear 2. In this kind of mode of use, a load F from the transmission of torque acts between the ring gear 2 and the counter gear 8. In FIG. 33, the pressure angle is ignored, so the load F acts in a direction at a right angle to a virtual line connecting the center of the sun gear 1 with the center of the counter gear 8.

Meanwhile, with respect to the fact that there is an inevitable gap e between the casing 5 and the bearing 9 that supports the ring gear 2, a carrier 4 is fixed to the casing 5, so a reaction force against the load F acts between the pinion gears 3, which are supported by the carrier 4, and the ring gear 2. Further, a load following the transmission of torque acts on each of the pinion gears 3.

Accordingly, the relationship between forces f1 and f2 that act on the pinion gears 3 and the load F is as shown by the arrows in FIG. 33, with the amount being:

$$f1 = (F/2) * \{(R/r) + 1\}$$

$$f2 = (F/2) * \{(R/r) - 1\},$$

wherein the radii r and R of the contact point between the pinion gears 3 and the ring gear 2 is the radius of the location upon which the load F acts.

The pinion gears 3 also mesh with the sun gear 1 and transmit the torque thereto, so the bearings of the pinion gears 3 receive a radial load that is two times that of each of the forces f1 and f2.

In this way, the force f1 acting on the pinion gear 3 that is closest to the contact point between the ring gear 2 and the counter gear 8 is larger than the force f2 acting on the other pinion gear 3. As a result, the strength or durability of the pinion gear 3 upon which the load is largest restricts the strength or durability of the overall planetary gearset.

This is true even when another element is fixed instead of the carrier 4 and torque is transmitted between another element that is not fixed and the rotating member outside of the planetary gearset. That is, the related art does not take into consideration the effect of the load generated by the transmission of torque between the rotating member outside of the planetary gearset and the planetary gearset. As a result, with the related art, the strength and durability of the overall planetary gearset is restricted by the strength and durability of a specific member.

Further, because the sun gear and the ring gear in the type of planetary gearset described above are rotatably arranged on the same axis, the bearings retaining these gears can be fixed on the outer periphery of a predetermined shaft or fixedly fitted to a boss portion that is integrated with the casing. As a result, those bearings can be lubricated relatively easily by supplying lubricating oil via the shaft or the boss portion.

On the other hand, because the pinion gears have a comparatively smaller diameter than the sun gear and the ring gear and transmit torque between those two gears, the pinion gears rotate quickly and receive a large load. ID addition, these pinion gears are fitted via bearings to pinion pins attached to the carrier, so those bearings are separated from the bearing that supports the sun gear and the bearing that supports the ring gear.

In this way, there are times when the load and speed conditions on the bearings that support the pinion gears are severe, so it is important that they be sufficiently lubricated. In this case, the bearings of the pinion gears can be lubricated by supplying lubricating oil to the rotational center of the carrier when the carrier is rotated. This lubricating oil then reaches the bearings of the pinion gears by centrifugal force from the rotation of the carrier, and lubricates them. However, in the planetary gearset, one of the rotating elements is often used as a fixed element. When the carrier is made that fixed element, the centrifugal force used in the lubrication of the pinion gears retained by that carrier is no longer available.

Here, Japanese Patent Laid-Open Publication No. 2001-227625 discloses a device in which a lubricating oil path forming member is fixed to one side of a carrier that is fixed to a case, the device supplying lubricating oil to the carrier via an oil path formed in the case and the lubricating oil path forming member. According to this construction, lubricating oil can be supplied to the carrier (or more correctly, to the pinion bearings) arranged between the rotational axis of the planetary gearset and an inner peripheral face of the case.

With the device disclosed in the aforementioned publication, lubricating oil is supplied to each of the pinion bearings by running naturally down the lubricating oil path. With respect to the lubricating oil formed in the vertical direction, however, oil holes leading the lubricating oil to the pinion bearings are formed orthogonal to the lubricating oil path, which makes it difficult to lead the lubricating oil running downward into the oil holes. As a result, the lubricating oil that has run down ends up collecting on the lower side. The lubricating oil collects until it reaches the height of the open edge of the oil holes, after which it enters the oil holes and is supplied to the pinion bearings.

Therefore, because the carrier does not revolve, the pinion bearing that is stopped on the upper side is not lubricated until the lubricating oil rises, which takes a long time. Further, when only a small amount of the lubricating oil runs down, a sufficient amount of lubricating oil does not collect so the level thereof does not rise, which may result in the problem of lubricating oil not being able to be supplied to the pinion bearing on the upper side.

Furthermore, a lubrication system is generally known that supplies lubricating oil to portions where there is friction and portions where heat is generated in a planetary gearset or the like such as that described above. Also, even in a typical gear mechanism that is not a planetary gearset, a lubrication system is widely known that lubricates and cools by kicking up lubricating oil to portions where there is friction and portions where heat is generated. One example of such a device is disclosed in Japanese Patent Laid-Open Publication No. 7-217725. In a differential gear disclosed in this publication, a drive shaft and a ring gear are rotatably provided in a differential carrier. Further, a hypoid gear formed on the drive shaft is engaged with the ring gear, and the drive shaft is supported by a bearing. Moreover, a lubricating oil sump is provided in the differential carrier, and a portion of the ring gear is submersed in the lubricating oil sump. Also, an oil reservoir with an inflow opening is provided inside the differential carrier above the drive shaft. An outflow opening is also formed above the drive shaft in the oil reservoir.

In the lubrication system of the aforementioned publication, when torque from the drive shaft is transmitted to the ring gear, the ring gear rotates and kicks up lubricating oil from the lubricating oil sump. When this happens, some of the lubricating oil adhered to the ring gear is thrown by centrifugal force in a direction tangential to the ring gear. This lubricating oil passes through the inflow opening and runs into the oil reservoir, after which it naturally drips down from the outflow opening to lubricate and cool the bearings.

In the lubrication system described in this publication, however, the lubricating oil is supplied to the oil reservoir in only one transfer step, being the transfer of the lubricating oil in the lubricating oil sump by the rotation of the ring gear. Therefore, when the oil reservoir and the ring gear are separated by a large distance, there may be a decrease in the amount of lubricating oil supplied to the oil reservoir. More specifically, when the rotation speed of the ring gear drops below a predetermined rotation speed, the centrifugal force, which is used to throw the lubricating oil, is weak, making the aforementioned problem even more pronounced. As a result, the degree of freedom of the layout of the oil reservoir and the ring gear is reduced. In order to solve the foregoing problems, the amount of lubricating oil kicked up by the rotation of the ring gear can be increased by increasing the surface area of the ring gear that is submersed in the lubricating oil sump. However, this creates another problem of increased power loss during the rotation of the ring gear due to the shearing resistance of the lubricating oil.

SUMMARY OF THE INVENTION

In view of the foregoing technical problems, it is one object the invention to provide a planetary gearset able to improve characteristics such as overall strength and durability by suppressing a load from torque transmission between an external member and the planetary gearset from acting more on one member (i.e., on a specific member) than on another.

Also, it is a second object of the invention to provide a lubrication system capable of supplying a sufficient amount of lubricating oil to a pinion bearing in a planetary gearset in which a carrier is fixed.

Still further, it is a third object of the invention to provide a lubrication system capable of suppressing a decrease in an amount of lubricating oil supplied to an oil reservoir, even if a rotating body and the oil reservoir are separated by a large distance; capable of supplying the lubricating oil to the oil reservoir that is in a location separated from a first rotating body, regardless of the rotation speed of that first rotating body; suppressing an increase in power loss of the first rotating body; and suppressing a decrease in a degree of freedom of a layout of a portion requiring lubrication and the first rotating body.

In order to achieve the first object of the invention, according to a first aspect of the invention, a fixed element is able to move in a radial direction from torque transmitted between an external rotating member and a rotating element other than that fixed element when torque is transmitted between that external rotating member and the other rotating element, and that other rotating element receives the radial load. More specifically, according to a first exemplary embodiment of the invention, a planetary gearset is provided with a sun gear, a ring gear, and a carrier that rotatably retains a plurality of pinion gears arranged between the sun gear and the ring gear, as elements. In this planetary gearset, one of the elements is made a fixed element while another is made a rotating element. This planetary gearset transmits torque between that rotating element and an external member that is provided in a location eccentric with respect to that rotating element. The fixed element is retained so as to be able to move in the direction of the load from the torque transmitted between the rotating element and the external member. A fixed portion that rotatably retains the rotating element receives the load from the torque transmitted between the rotating element and the external member.

Therefore, according to the first aspect of the invention, the load from the transmission of torque between the rotating element and the external member is transmitted to the fixed element via the pinion gear. As a result, the fixed element moves from the load. That is, the fixed element and the pinion gear do not support the load. When the fixed element moves, the rotating element moves to close a gap between it and the fixed portion, such that the fixed portion receives the load. Accordingly, although the load from the transmission of torque between the sun gear and the ring gear acts on the pinion gears, that load is not applied unevenly among the pinion gears. As a result, characteristics such as strength and durability of the overall planetary gearset are not restricted by the strength and durability of a specific pinion gear.

Also with the planetary gearset according to the first aspect of the invention, it is possible to retain the fixed element on the fixed portion via an elastic member. As a result, the fixed element is able to move, and the elastic member acts as an absorber so noise and vibration are able to be minimized or eliminated.

Also, with the planetary gearset according to the first aspect of the invention, it is also possible to make the fixed element the carrier and the rotating element the ring gear. Accordingly, torque is transmitted between the ring gear and the external member, with the carrier moving by the load from that transmission in the direction of that load. As a result, the gap between the ring gear and the fixed portion closes and the load is supported by the fixed portion through the ring gear such that a case in which a larger load is applied to one of the pinion gears retained by the carrier than another is suppressed. Therefore, it is possible to improve the characteristics such as strength and durability of the planetary gearset on the whole.

Meanwhile, in a planetary gearset according to a second aspect of the invention, a plurality of pinion gears are arranged in the circumferential direction between a sun gear and a ring gear which are on the same rotational axis. These pinion gears are rotatably mounted to a carrier which is fixed so as not to rotate, and torque is transmitted between the sun gear or the ring gear and an external member which is eccentric with respect to the sun gear and ring gear. In addition, these pinion gears are arranged away, in the circumferential direction, from the location at which torque is transmitted (hereinafter, referred to as "torque transmitting point") between the sun gear or the ring gear and the external member.

Accordingly, because the carrier does not rotate, the load from the transmission of torque between the sun gear or the ring gear and the external member acts on the pinion gears retained by the carrier. Because the pinion gears are arranged away, in the circumferential direction, from the torque transmitting point between the sun gear or the ring gear and the external member, the load tends to be distributed between the plurality of pinion gears. As a result, the load concentrates less on any one pinion gear, thereby improving the characteristics such as strength and durability of the planetary gearset as a whole.

Further, in the planetary gearset according to the second aspect of the invention, the pinion gears may also be arranged such that the torque transmitting point lies between two of the pinion gears.

Accordingly because there are two pinion gears on which the load tends to concentrate, the load on these pinion gears is distributed such that the load on any one of the two pinion gears becomes relatively light. As a result, the characteristics such as strength and durability of the planetary gearset as a whole are able to be improved.

In a planetary gearset according to a third aspect of the invention, a plurality of pinion gears are arranged in the circumferential direction between a sun gear and a ring gear which are arranged on the same rotational axis. These pinion gears are rotatably mounted to a carrier which is fixed so as not to rotate, and torque is transmitted between the sun gear or the ring gear and an external member which is eccentric with respect to the sun gear and ring gear. In addition, more of the pinion gears are arranged in an area near, in the circumferential direction, the torque transmitting point where torque is transmitted between the sun gear or the ring gear and the external member than in an area away from that torque transmitting point.

Accordingly, because more of the pinion gears are arranged in an area near, in the circumferential direction, the torque transmitting point where torque is transmitted between the sun gear or the ring gear and the external member, and because the carrier is fixed so as not to rotate, the relative position of the torque transmitting point and the pinion gears is maintained. As a result, an uneven load from the torque transmitted between the sun gear or the ring gear and the external member is distributed between more pinion gears, such that the load acting on any one pinion gear is relatively light. As a result, the characteristics such as strength and durability of the planetary gearset as a whole are able to be improved.

In order to achieve the second object of this invention, in the planetary gearset according to any one of the first through third aspects of the invention, an oil sump that collects some of the lubricating oil that naturally runs down and which then supplies that lubricating oil to pinion bearings is provided midway in an oil path which leads that lubricating oil. More specifically, in a planetary gear lubrication system of a planetary gearset, a plurality of pinion gears is arranged between the sun gear and the ring gear, which are on the same rotational axis. These pinion gears are rotatably retained via bearings by pinion pins mounted to the carrier which is constantly fixed. A passage that leads the lubricating oil that runs down from above is formed that connects the axial ends of the pinions pins from the axial ends of the upper pinion pins to the axial ends of the lower pinion pins in that order. Furthermore, an oil sump is formed at a location corresponding to the axial end of at least one of the pinion pins. This oil sump collects the lubricating oil that runs down into it, and is intercommunicated with the at least one of the pinion pins.

Therefore, in the planetary gearset according to any one of the first through third aspects of the invention, as the lubricating oil runs down the oil path vertically connecting the axial ends of the pinion pins retained by the fixed carrier, it runs into the oil sump formed in a middle portion and collects here. Communication between this oil sump and the bearings fitted to the pinion pins enables the lubricating oil to be supplied to the pinion bearings from this oil sump. That is, even with a pinion bearing that is positioned relatively high, the lubricating oil collects in the oil sump provided in a relatively high location that corresponds to that pinion bearing and is supplied to the pinion bearing from this oil sump. As a result, the lubricating oil is supplied to the pinion bearing that is positioned relatively high so as to lubricate it soon after the lubricating oil starts to be supplied to the oil path.

Also in order to achieve the second object of the invention, in the planetary gearset according to any one of the first through third aspects of the invention, a plurality of pinion gears is arranged between the sun gear and the ring gear, which are on the same rotational axis. These pinion gears are rotatably retained via bearings by pinion pins mounted to the carrier which is constantly fixed. Further, a planetary gear bearing lubrication system of the planetary gearset is provided in which oil holes extending from the axial ends of those pinion pins to the bearings are formed in the pinion pins. In this planetary gear bearing lubrication system, an oil path leading lubricating oil that runs down from above is formed that connects the open ends of the oil holes from the open ends of the upper oil holes to the open ends of the lower oil holes in that order. Furthermore, an oil sump is formed at a location corresponding to the open end of at least one of the pinion oil holes. This oil sump collects the lubricating oil that runs down into it, and is intercommunicated with the at least one of the pinion pins.

Therefore, in the planetary gearset according to any one of the first through third aspects of the invention, an oil path which opens to oil holes formed in the pinion pins is formed in the vertical direction. The lubricating oil is supplied to this oil path from above and runs downward. As the lubricating oil runs down the oil path vertically connecting the axial ends of the pinion pins retained by the fixed carrier, some of it runs into the oil sump formed in a middle portion and collects here. Because the oil holes open to this oil sump, the lubricating oil is able to be supplied to the pinion bearings through these holes from this oil sump. That is, even with a pinion bearing that is positioned relatively high, the lubricating oil collects in the oil sump provided in a relatively high location that corresponds to that pinion bearing, and is supplied to the pinion bearing from this oil sump. As a result, the lubricating oil is supplied to the pinion bearing that provided in a relatively high position so as to lubricate it soon after the lubricating oil starts to be supplied to the oil path.

In the planetary gearset according to any one of the first through third aspects of the invention, a plurality of the oil sumps may also be formed, and one of those oil sumps may be formed with a different lubricating oil collecting capacity than the other oil sumps.

Accordingly, the speed with which the lubricating oil collects, and the amount of lubricating oil collected, differ depending on the shape of the oil sump. As a result, lubricating oil at a speed and of an amount in accordance with the shape of the oil sump may be supplied to the pinion bearings via the oil holes in the pinion pins that arranged corresponding to the oil sumps.

Furthermore, in order to achieve the third foregoing object of the invention, in a planetary gearset according to any one of the first through third aspects of the invention, a lubrication system that supplies a portion requiring lubrication with lubricating oil transferred by rotation of a first rotating body, has a second rotating body which retains lubricating oil transferred by the rotation of the first rotating body to portions requiring lubrication, and transfers that lubricating oil to the portion requiring lubrication by rotating.

According to this aspect, the lubricating oil is transferred in a plurality of steps, the first being the transfer of the lubricating oil by rotation of the first rotating body, and the second being the transfer of the lubricating oil by rotation of the second rotating body. Accordingly, even if the first rotating body is separated from the oil reservoir, a reduction in the amount of lubricating oil supplied to the oil reservoir is able to be suppressed. In addition, the lubricating oil is able to be supplied to the oil reservoir even when that oil reservoir is separated from the first rotating body regardless of the rotation speed of the first rotating body. Furthermore, it is possible to suppress an increase in the surface area of the first rotating body that is submersed in the lubricating oil.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 12 is a front view of one example of a spacer provided with an elastic piece for pressing toward the partition portion;

DETAILED DESCRIPTION OF THE PREFERRED EMBODIMENTS

First Embodiment

Figure 3:
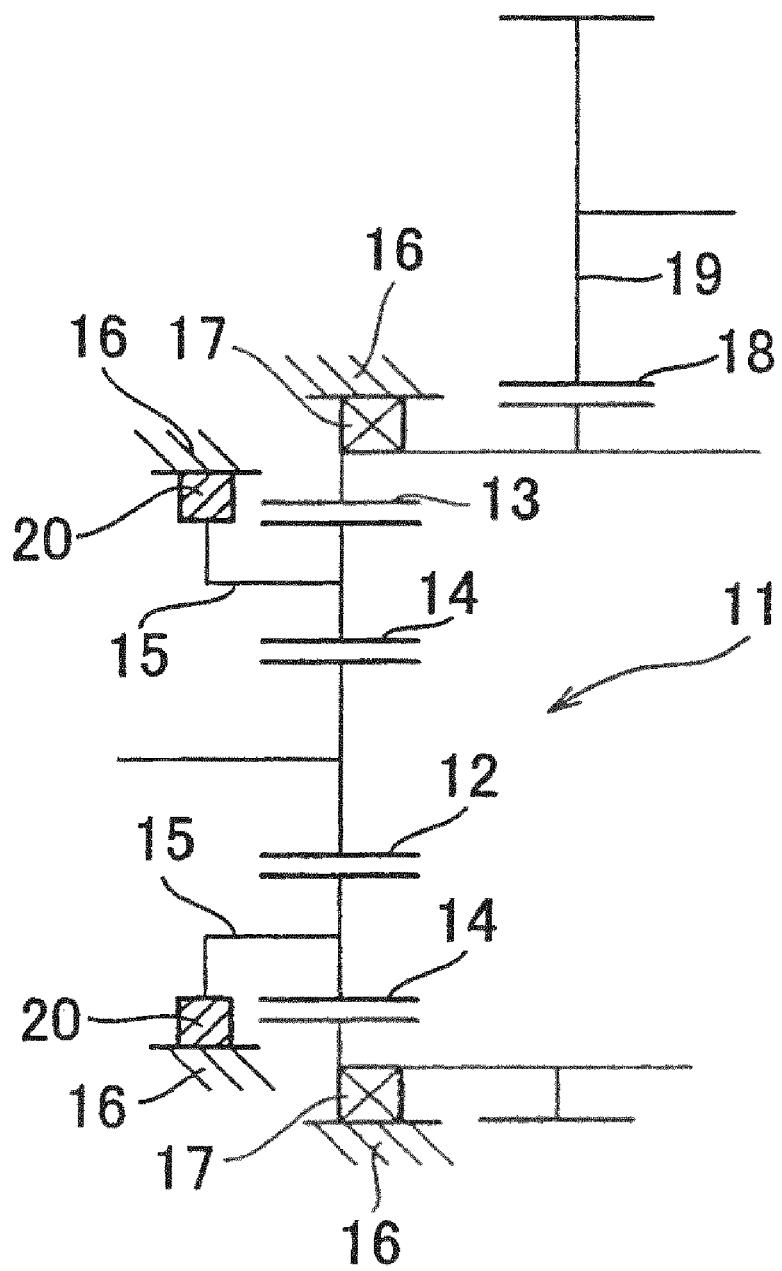
FIG. 3 is a skeleton view showing one example of a planetary gearset according to the invention.

Next, a first exemplary embodiment of this invention shall be described with reference to a specific example shown in the drawings. In brief, one example of a planetary gearset 11 that is the object of this invention is a so-called single pinion type planetary gearset of a well known configuration, as shown in FIG. 3, which includes as its main components a sun gear 12, a ring gear 13 disposed on the same axis as the sun gear 12, and a carrier 15 that rotatably retains a plurality of pinion gears 14 (planet gears) meshed with the sun gear 12 and the ring gear 13. The ring gear 13 is rotatably supported via a bearing 17 by a predetermined fixed portion, e.g., a casing 16.

Also, external teeth 18 are formed on the outer peripheral surface of the ring gear 13. Further, a counter gear 19 which corresponds to an external member of this invention is disposed at a predetermined position on the outer peripheral side of the ring gear 13, i.e., at a predetermined position that is eccentric with respect to the planetary gearset 11. Further, this counter gear 19 and the external teeth 18 on the ring gear 13 are meshed. Accordingly, the portion at which the teeth of these two gears mesh is the location at which torque is transmitted (hereinafter, referred to as "torque transmitting point") P. There is almost no change in this point in the circumferential direction.

The planetary gearset 11 shown in FIG. 3 has the carrier 15 as a fixed element that is coupled in a non-rotating state to the casing 16 via predetermined coupling means 20. This coupling means 20 is of a particular structure that allows the carrier 15 to move in a predetermined radial direction without rotating. That radial direction is a direction in which a load generated by torque transmitted between the counter gear 19 and the ring gear 13 acts. Schematically speaking, that radial direction is the direction orthogonal to a line that connects the rotational axis of the ring gear 13 and the rotational axis of the counter gear 19. More accurately, the radial direction is the direction after correcting that orthogonal direction with a pressure angle of the teeth face of the meshing counter gear 19 and the external teeth 18 and a pressure angle of the teeth face of the meshing ring gear 13 and the pinion gears 14.

The device used as this coupling means 20 of this kind of particular configuration can vary when necessary. For example a grooved spline that allows movement in the aforementioned direction, or a ring-shaped support member or the like that houses an elastic member such as a spring or rubber may be used as this coupling means (also referred to as "spline") 20.

In the planetary gearset 11, because the carrier 15 is a fixed element, one of the sun gear 12 and the ring gear 13 becomes an input element and the other becomes an output element. Regardless of which is which, torque is transmitted between the ring gear 13 and the counter gear 19. A typical representation of this state is shown in FIGS. 1 and 2.

Figure 33:
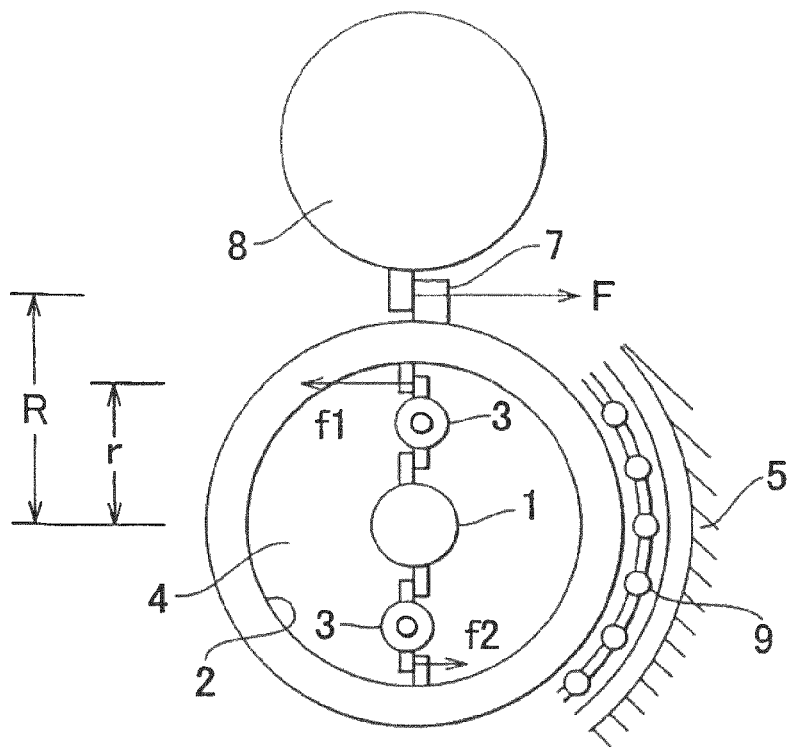
FIG. 33 is a representative view illustrating the state of loads acting in a planetary gearset of a related art.
Figure 34:
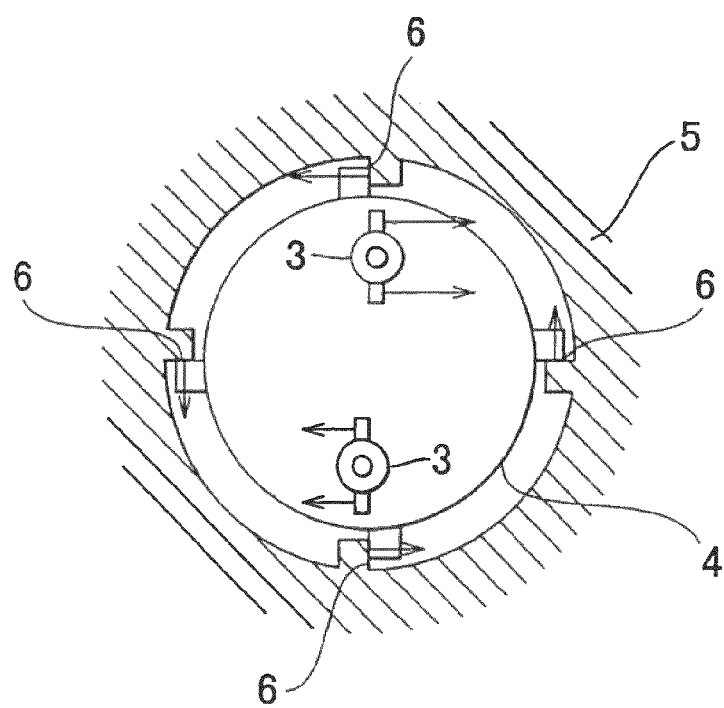
FIG. 34 is another representative view illustrating the state of the loads acting on the planetary gearset of the related art.

In the example shown, two pinion gears 14 are disposed symmetrically opposite each other across the sun gear 12. Further, spline teeth are provided on only a portion of the spline 20 that prevents the carrier 15 from rotating, so as to allow the carrier 15 to move in the aforementioned direction. It should be noted that FIGS. 1 and 2 are shown simplified, as are FIGS. 33 and 34.

Figure 1:
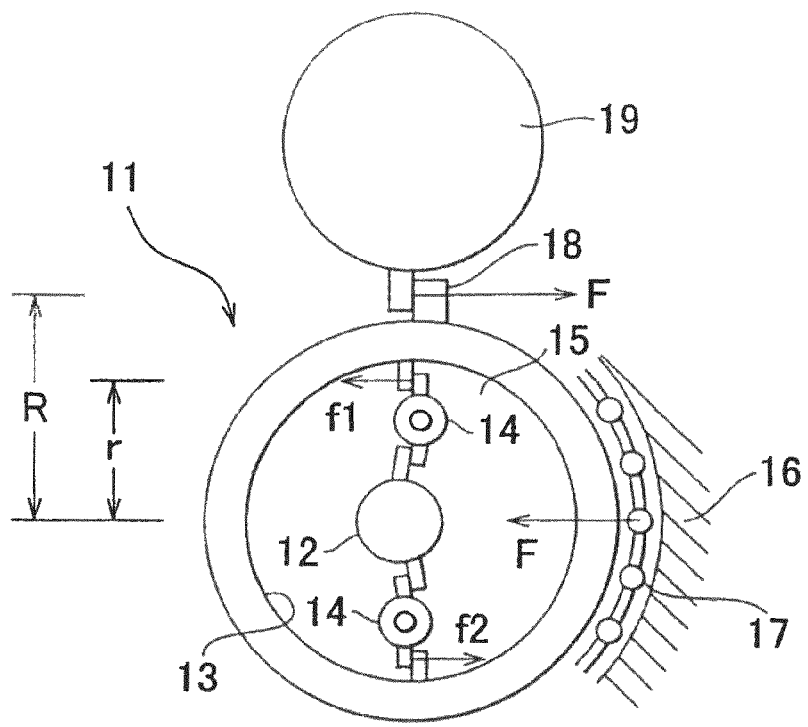
FIG. 1 is a representative view illustrating the state of loads acting in a planetary gearset according to the invention.

Referring to FIG. 1, when the ring gear 13 rotates to the left relative to the counter gear 19, for example, such that the external teeth 18 thereof engage with the counter gear 19, a load F from the torque transmitted between the gears is generated in the direction to the right in FIG. 1. In order to allow the ring gear 13 to rotate, there is a permanent gap (for example, of approximately several tens to several hundred μ) between the ring gear 13 and the bearing 17 that supports the ring gear 13. As a result, the ring gear 13 is able to move within that range.

Figure 2:
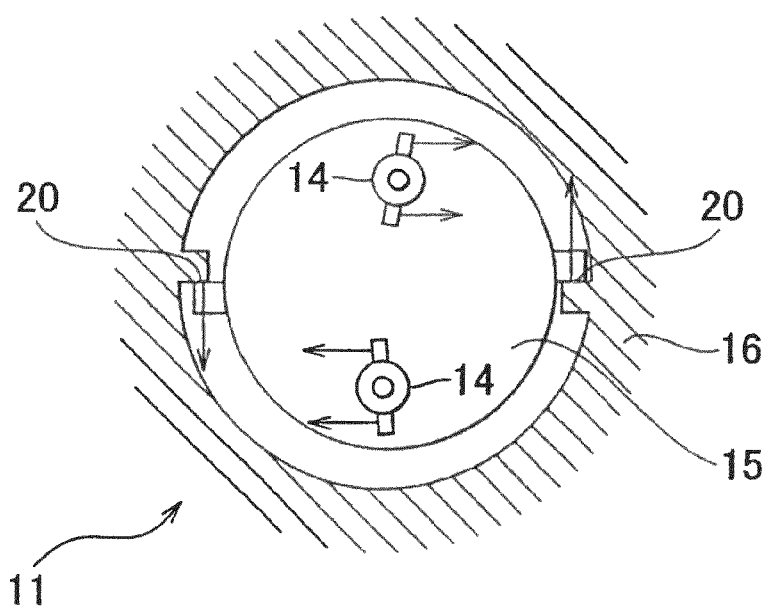
FIG. 2 is another representative view illustrating the state of the acting loads.

Moreover, although rotation of the carrier 15, which is coupled to the ring gear 13 via the pinion gears 14, is prevented by the so-called grooved spline 20, as described above, the carrier 15 is able to move to the left and right in FIGS. 1 and 2. Accordingly, when the load F from the torque transmitted between the ring gear 13 and the counter gear 19 is applied, the carrier 15 moves to the right in FIGS. 1 and 2, along with the ring gear 13.

FIGS. 1 and 2 show the resultant state of the planetary gearset after this movement. In this state, the gap between the ring gear 13 and the bearing 17 which supports the ring gear 13 is closed and the ring gear 13 is prevented from moving by the casing 16. That is, the load acting to move the carrier 15 and the ring gear 13 is received by the casing 16. As a result, a reaction force F' of the same size as the load F acts on the ring gear 13 from the casing 16, i.e., in the direction opposite that of the load F.

Therefore, the load generated by the load F from the torque transmitted between the ring gear 13 and the external counter gear 19 does not act on the pinion gears 14. That is, only loads f1 and f2 from the torque transmitted between the sun gear 12 and the ring gear 13 act on the pinion gears 14, and moreover, those loads f1 and f2 are equal (=FR/2). Therefore, although a radial load that is two times each of those loads acts on the bearing of the pinion gears 14, that radial load is the normal load from torque transmission.

As described above, in the planetary gearset 11 according to this invention, the load acting on the pinion gears 14 is limited to the load from the transmission of torque between the sun gear 12 and the ring gear 13. The load from the transmission of torque between the ring gear 13 and the external counter gear 19 does not act on the pinion gears 14, and the loads on the pinion gears 14 or the bearings thereof are equal. In other words, because cases such as that in which the load acting on a specific pinion gear 14 becomes particularly large do not occur, characteristics such as strength and durability of a specific pinion gear 14 does not restrict the characteristics, such as strength and durability, of the entire planetary gearset 11.

According to the planetary gearset 11 described above, the carrier 15, which is a fixed element, is able to be fixed to the casing 16, which is a fixed portion, via the coupling means 20 that houses an elastic member. With this configuration, it is possible to equalize the load acting on the pinion gears 14 by moving the carrier 15 as described above. At the same time, vibration of the pinion gears 14 is able to be absorbed by the elastic member, such that vibration and noise of the entire planetary gearset 11 are able to be eliminated or minimized.

In the specific example described above, the load from the torque transmitted between the ring gear 13 and the external counter gear 19 is received by a fixed portion such as the casing 16. As a result, the load acting on the pinion gears 14 is reduced such that the strength and durability of a specific one of the pinion gears 14 does not restrict the strength and durability of the entire planetary gearset 11. Alternatively, however, the load on a specific one of the pinion gears 14 can also be reduced by distributing the load from the torque that is transmitted between the ring gear 13 and the external counter gear 19. An example of this is as follows.

Second Embodiment

Figure 4:
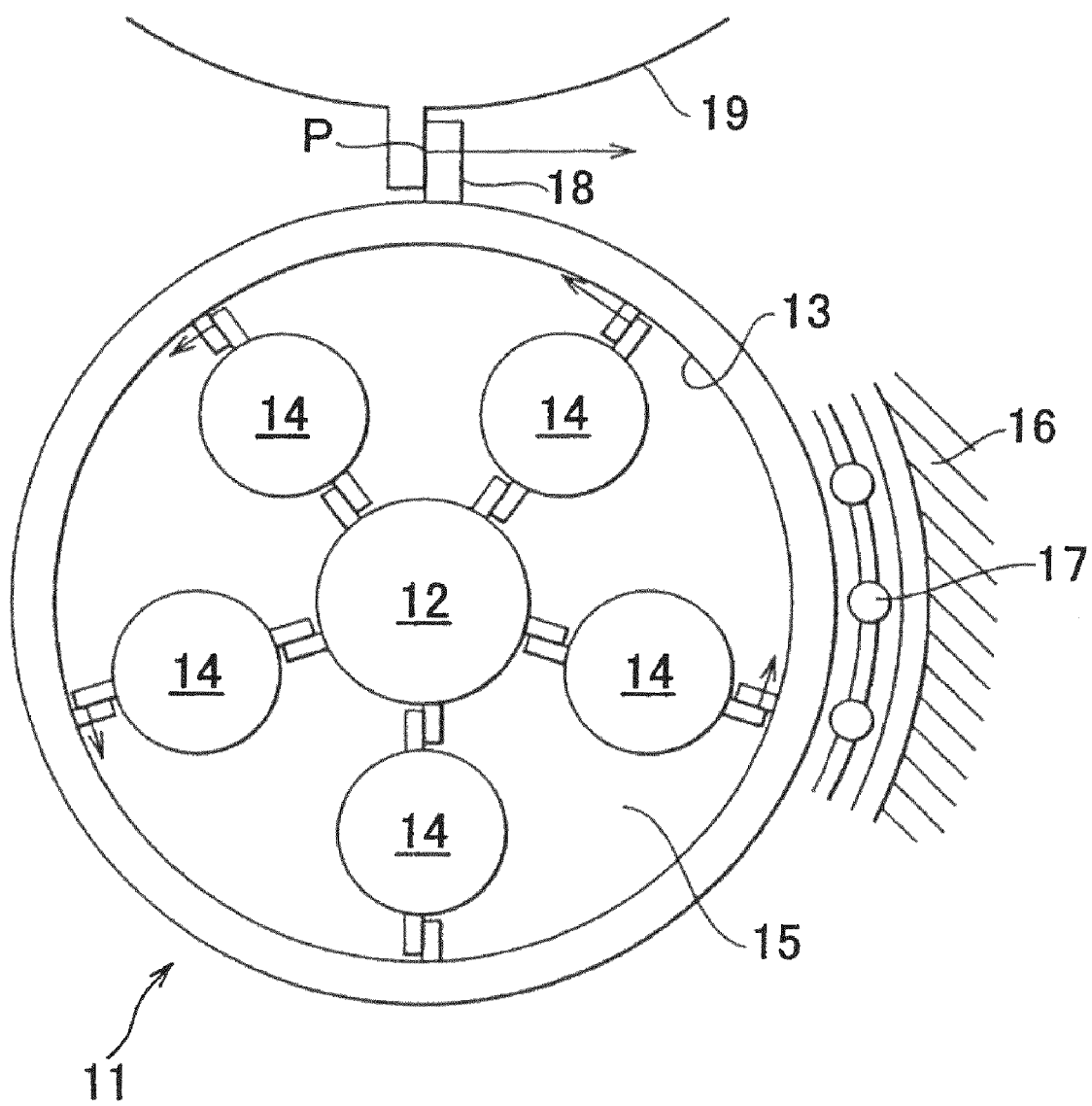
FIG. 4 is a representative view showing another example of the invention.

A second exemplary embodiment of the invention will hereinafter be described with reference to the drawings. FIG. 4 shows an example of the planetary gearset 11 in which five pinion gears 14 are arranged in the circumferential direction at equidistant intervals. The carrier 15 that retains these pinion gears 14 is fixed to the casing 16 so as not be able to rotate or move in the radial direction. Also, the ring gear 13 is meshed with the counter gear 19 by external teeth 18, just as in the foregoing example.

Accordingly, in the example shown in FIG. 4 as well, the positions of the pinion gears 14 are fixed, so that the location at which torque is transmitted (i.e., the torque transmitting point) between the ring gear 13 and the counter gear 19, i.e., the relative positions of each of the pinion gears 14 and the engaging point of the external teeth 18 of the ring gear 13 and the counter gear 19, is fixed. More specifically, two of the pinion gears 14 are disposed separated at equal angles on both sides of the torque transmitting point in the circumferential direction.

The other three pinion gears 14 are disposed at equidistant intervals in the circumferential direction from those two pinion gears 14. Accordingly, the pinion gear 14 at the bottom in the FIG. 4 is disposed on the side opposite (i.e., is disposed in a location symmetrically opposite, with respect to the center of the sun gear 12) the torque transmitting point P in the circumferential direction. In other words, two pairs of pinion gears 14 are disposed in positions so that they are symmetrical to each other on the left and right sides of the sun gear 12 when it is divided by an imaginary line extending from the torque transmitting point P through the center of the sun gear 12.

Because the carrier 15 which retains these pinion gears 14 is fixed, the load from the torque transmitted between the ring gear 13 and the counter gear 19 acts on the pinion gears 14. However, none of the pinion gears 14 are disposed directly below the torque transmitting point P in FIG. 4, i.e., between the torque transmitting point P and the sun gear 12 on the imaginary line extending from the torque transmitting point P through the center of the sun gear 12. Rather, one of the pinion gears 14 is disposed in a location off of that imaginary line. As a result, the load F acts on the pinion gears 14 after being distributed in accordance with the angle of separation from the torque transmitting point P. In the example in FIG. 4, the pinion gears 14 are disposed in positions of left-right symmetry such that the load acts equally on both the left and right sides of the carrier 15.

Figure 5A:
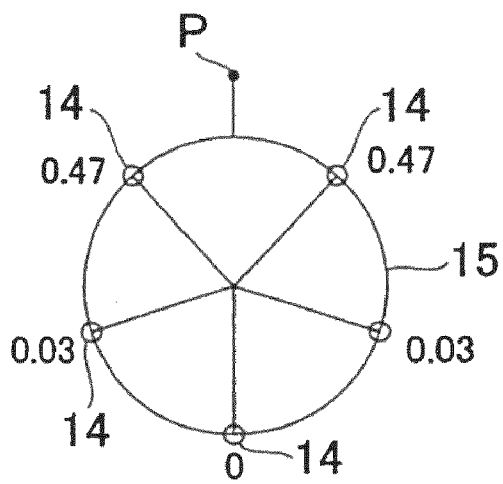
FIG. 5 is a line graph showing several examples of arrangements of a plurality of pinion gears and their load distribution ratios.

That is, in the example shown in FIG. 4, the load on the upper two pinion gears 14 is large, the load on the lower two pinion gears 14 is small, and the load on the one bottom pinion gears 14 is even smaller. FIG. 5A shows one example of load distribution ratios of the pinion gears 14 with the configuration shown in FIG. 4. For comparison, FIG. 5B shows the load distribution ratios when one of the pinion gears 14 is disposed directly below the torque transmitting point P.

Figure 5B:
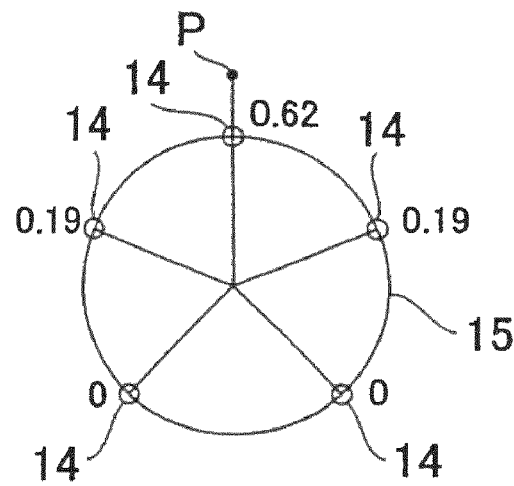

As is evident by comparing FIGS. 5A and 5B, the load distribution ratios are reduced by offsetting the pinion gears 14 in the circumferential direction from the point at which torque is transmitted to the external member. As a result, a large load is not concentrated on a specific pinion gear 14, thereby enabling the characteristics such as the strength and durability of the entire planetary gearset 11 to be improved.

Figure 5C:
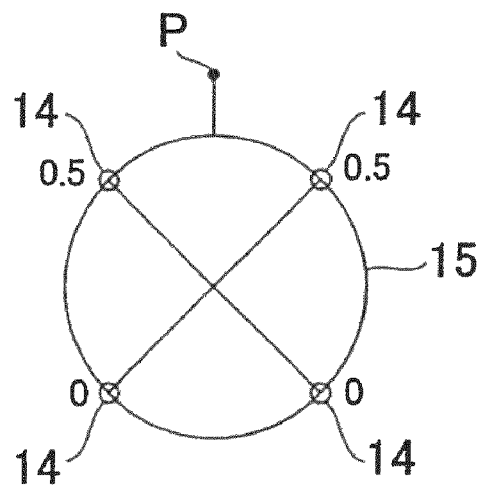

FIG. 5C shows an example in which four pinion gears 14 are provided. Examples of the load distribution ratios of the pinion gears 14 are also indicated in the figure. In this case, the pinion gears 14 are in positions of left-right symmetry across an imaginary line straight down from the torque transmitting point P. As a result, the largest torque on the pinion gears 14 is able to be reduced the most.

Figure 5D:
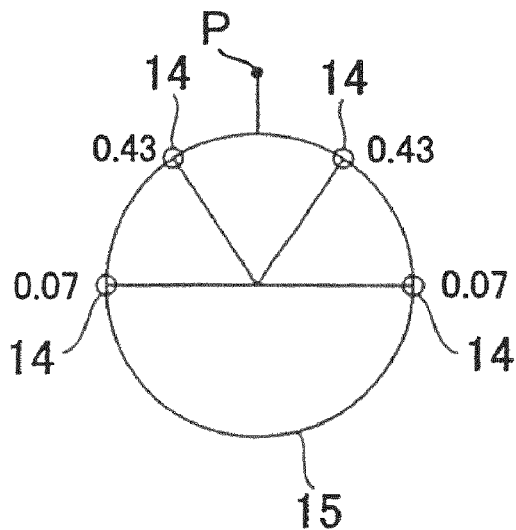

Further, in each of the examples described above, the plurality of pinion gears 14 are disposed at equidistant intervals. When the intervals between the pinion gears 14 can be set arbitrarily, however, it is preferable to arrange the pinion gears 14 as shown in FIG. 5D. That is, it is preferable to have a high concentration of the pinion gears 14 in the area near the torque transmitting point P, and a low concentration of the pinion gears 14 in the area away from the torque transmitting point P. More specifically, all of the pinion gears 14 are arranged in the area on the upper half of the carrier 15 in the example shown in FIG. 5D.

As shown in FIG. 5D, with this type of configuration, because the load from the torque transmitted to the external member by all four pinion gears 14 is distributed, the largest value of that load distribution ratio becomes smaller. As a result, disadvantageous conditions with respect to strength and durability and the like are able to be improved, thereby eliminating or minimizing a reduction in strength and durability of the entire planetary gearset 11.

It should be noted that the invention is not limited to the specific examples described above. The invention may also be applied to a type of planetary gearset other than a single pinion type planetary gearset, such as a double pinion type or a Ravigneaux type planetary gearset. Also, the fixed element in this invention may be the sun gear or the ring gear, instead of the carrier. In this case as well, similar operation and effects to those with the foregoing specific examples can be obtained. Further, the external member in this invention is not limited to being a gear provided on the outer peripheral side of the ring gear. That is, the external member may be a member which transmits torque at a part in the circumferential direction to a rotating element such as the ring gear, and which is arranged so that its axis is eccentric from the axis of the planetary gearset.

Third Embodiment

Figure 6:
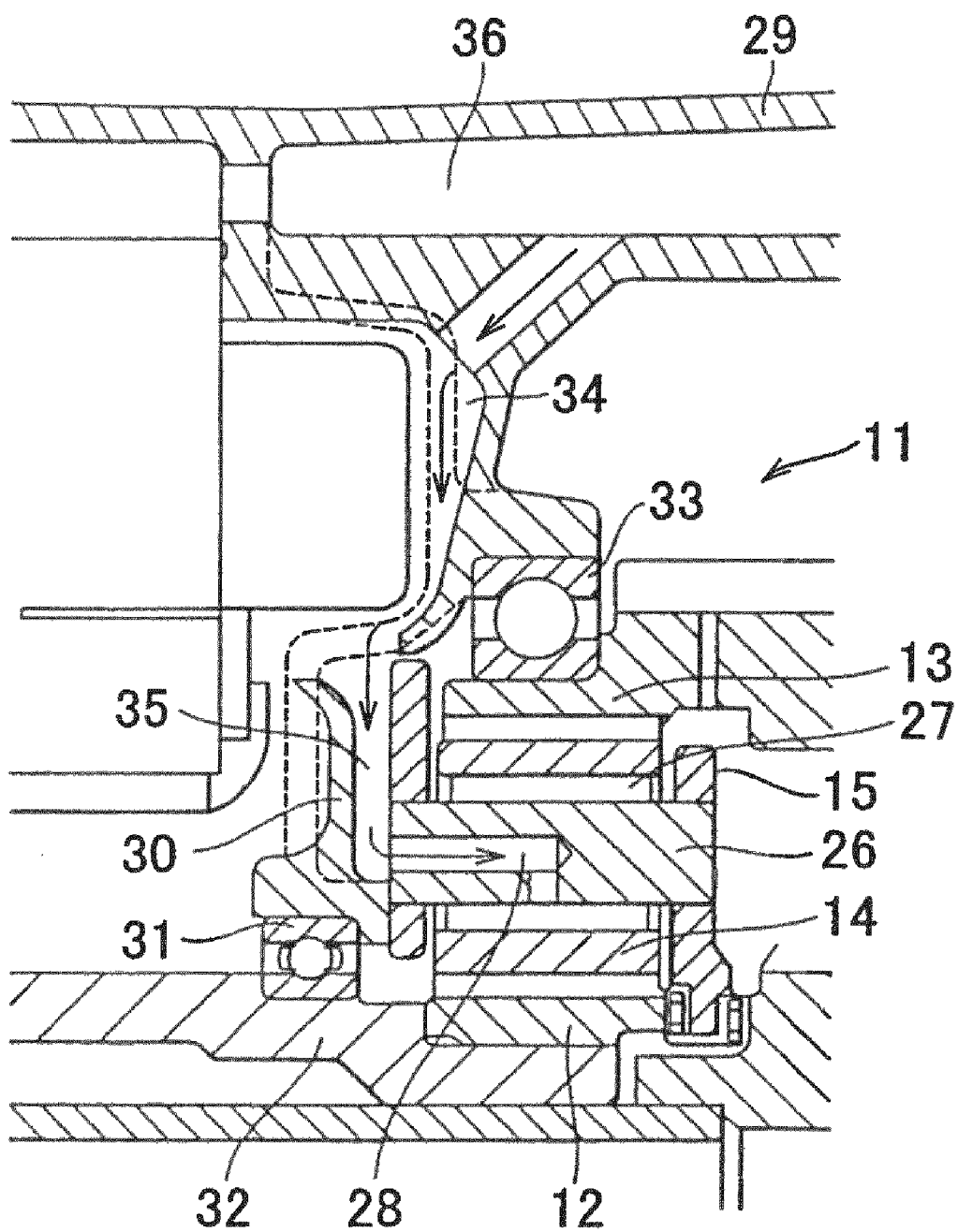
FIG. 6 is a front view showing one example of a shape of an oil path and an oil sump in a lubrication system according to the invention.
Figure 7:
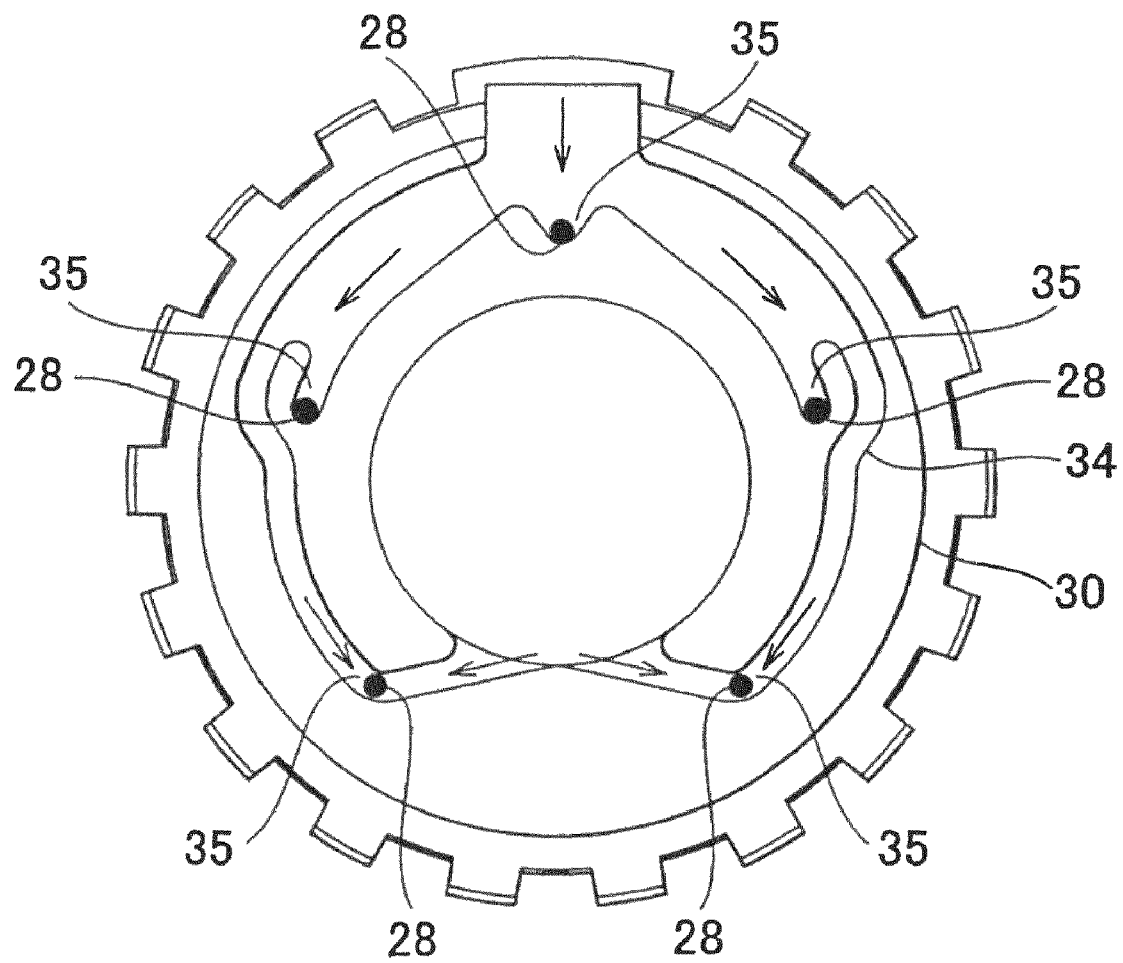
FIG. 7 is a cross-sectional view showing the lubrication system in FIG. 6.

Next, a third exemplary embodiment of this invention shall be described with reference to a specific example shown in the drawings. Structures in the third exemplary embodiment which are the same as those in the first and second exemplary embodiments shall be denoted by the same reference numerals used in the first and second exemplary embodiments, and descriptions thereof will be omitted. FIGS. 6 and 7 show the planetary gearset 11 to which this third exemplary embodiment has been applied. This planetary gearset 11 is a so-called single pinion type planetary gearset just as in the first exemplary embodiment, in which the sun gear 12, which is a gear with external teeth, and the ring gear 13, which is a gear with internal teeth, are arranged on the same axis and pinion gears 14 are arranged between the sun gear 12 and the ring gear 13. In the example shown in the figure, there are five pinion gears 14, with each pinion gear 14 being meshed with both the sun gear 12 and the ring gear 13.

The pinion gears 14 are disposed at equidistant intervals in the circumferential direction and are retained by the carrier 15 so as to be able to rotate freely with the intervals between the pinion gears 14 maintained. That is, the carrier 15 is a member in which a pair of circular discs arranged so as to sandwich the pinion gears 14 are linked in a position so as not to interfere with the pinion gears 14. Five pinion pins 26 supported at both end portions by the pair of circular discs that are included in the carrier 15, are arranged at equidistant intervals in the circumferential direction of the carrier 15. The pinion gears 14 are then rotatably retained via pinion bearings 27 on the pinion pins 26.

A oil hole 28 is formed in each pinion pin 26, which extends from one end face (the end face on the left side of the pinion pin 26 in FIG. 6) in the axial direction to a middle portion in the axial direction, where it opens to the outer peripheral surface. The end portions of the pinion pins 26 go through the discs that are included in the carrier 15, such that the oil holes 28 open to the shaft end side.

The planetary gearset 11 is housed within a casing 29, and is retained by a partition portion 30 formed integrally with the inner portion of the casing 29. That is, the partition portion 30 is a disc-shaped portion formed so as to stick out from the inside face of the casing 29 in the radial direction toward the center of the casing 29. A sun gear shaft 32, which is rotatably retained via a bearing 31 fitted to the inner peripheral end portion of the partition portion 30, is spline-fitted to the inner peripheral portion of the sun gear 12. Moreover, a cylindrical portion which protrudes in the axial direction is formed at a mid portion of the partition portion 30. The ring gear 13 is rotatably retained by a bearing 33 fitted to the inner peripheral side of that cylindrical portion.

The partition portion 30 is positioned on the shaft end side to which the oil holes 28 formed in the pinion pins 26 open. The carrier 15 fixed so as not to rotate, such that a portion thereof contacts the partition portion 30.

An oil path 34 is formed on a side face, on the planetary gearset 11 side, of the partition portion 30. This oil path 34 may have a tube-like shape. In the example shown in the figure, however, the oil path 34 is configured as a groove formed in the side face of the partition portion 30. Furthermore, this oil path 34 is circular and is, on the whole, centered around the center portion of the partition portion 30. The widths of the upper openings (i.e., the openings in the portion on the upper side when in actual use) of the oil path 34 in the figure are relatively wide and the widths of the lower openings (i.e., the openings below the mid portion) of the oil path 34 are relatively narrow. The oil path 34 is also shaped appropriately.

Accordingly, the oil path 34 connects the end portions where the oil holes 28 of the pinion pins 26 open from the upper pinion pins 26 to the lower pinion pins 26 in that order. The upper end portion of the oil path 34 opens to the upper side of the partition portion 30 and the lower end portion of the oil path 34 opens to the inner peripheral side of the partition portion 30.

The oil sump 35 is also provided in a shape that changes the shape of part of the oil path 34. This oil path 34 is formed by changing the shape of a portion of the side wall that defines the oil path 34, at locations corresponding to the end portions of each pinion pins 26. The oil path 34 is intercommunicated with the pinion bearings 27, which are fitted to the pinion pins 26, via the oil holes 28 and notches (not shown) provided in the discs included in the carrier 15, and the like.

More specifically, the oil path 34 corresponding to the highest pinion pin 26 is formed as a V-shaped recessed portion. Also, the oil sump 35 corresponding to the left and right pinion pins 26 located in the middle portion in the vertical direction are formed as arc-shaped recessed portions that curve upward. the oil holes 28 formed in the pinion pins 26 open to the portions at the bottom of those recessed portions. Further, the oil sumps 35 corresponding to the pinion pins 26 in the very lowest positions are curved upward in a V-shape, and the oil holes 28 formed in the pinion pins 26 opens to those curved portions. In FIG. 7, the location of the opening of the oil holes 28 is denoted by a "●". Accordingly, the open end of each of the oil holes 28 is connected to the oil path 34 in order from top to bottom.

In this way, the shape of the oil sump 35 varies. In particular, with the example shown in the figure, the shape varies depending on the position of the oil sump 35 in the vertical direction. That is, lubricating oil that runs down from the upper portion of the oil path 34 runs directly into the highest oil sump which makes it easy for the lubricating oil to enter the oil hole 28 formed in the pinion pin 26 in the location that corresponds to this oil sump 35. Accordingly, this oil sump 35 is formed relatively shallow. On the other hand, the lubricating oil does not easily enter the oil holes 28 in the pinion pins 26 that are located at the middle portion in the vertical direction, so the corresponding oil sumps 35 are formed relatively deep. Also, the oil sumps 35 at the lowest portion are portions in the oil path 34 where the lubricating oil passing therethrough naturally collects and lubricating oil from the inner peripheral side of the partition portion 30. Also, because the lubricating oil also flows into these low oil sumps 35 from the inner peripheral side of the partition portion 30, the oil path 34 at these locations is formed in a simple curve.

Meanwhile, a reservoir portion 36, which is a hollow portion, is formed at the upper portion of the casing 29. This reservoir portion 36 is a portion that temporarily collects lubricating oil kicked up by the rotation of proper rotating members such as gears, as well as lubricating oil sent through an oil path, not shown. The upper end portion of the oil path 34 is intercommunicated with this reservoir portion 36. That is, lubricating oil sent to the reservoir portion 36 naturally runs down into the oil path 34.

Next, operation of the foregoing lubrication system shall be explained. When the system including the planetary gearset 11 is operated and lubricating oil is sent, or a predetermined rotating member is rotated, the lubricating oil runs into the reservoir portion 36 formed in the upper portion of the casing 29, where it is temporarily collected. Because the oil path 34 is intercommunicated with, and is located below, the reservoir portion 36, the lubricating oil in the reservoir portion 36 naturally runs down into and along the oil path 34.

Referring to FIG. 7, the oil path 34 is shaped so that it branches off to the left and right from the highest oil sump 35. As a result, lubricating oil first runs into the highest oil sump 35, where a predetermined amount of the lubricating oil is collected. The lubricating oil collected in the oil sump 35 is then supplied from there to the highest pinion bearing 27 so as to lubricate it. In the example shown in the figure, when the lubrication oil is supplied to the pinion bearings 27 via the oil holes 28 formed in the pinion pins 26, i.e., when the lubricating oil starts to be supplied to the oil path 34, the lubricating oil is immediately supplied to those pinion bearings 27 so as to lubricate them, so that no lack of lubrication, even temporary, will occur even at the highest pinion bearing 27.

Excess lubricating oil that exceeds the capacity of the highest oil sump 35 runs down the oil path 34. Therefore, some of that excess lubricating oil runs into the oil sumps 35 formed in the middle portion in the vertical direction, where it collects. Accordingly, the lubricating oil captured in these oil sumps 35 is supplied from here to the pinion bearings 27 positioned in the middle portion in the vertical direction so as to lubricate them. That is, the lubricating oil runs from the oil sumps 35 into the oil holes 28 in the oil sumps 35, and is supplied via those oil holes 28 to the pinion bearings 27 in the middle portion in the vertical direction so as to lubricate them.

A sufficient amount of the lubricating oil needed for the middle pinion bearings 27 is ensured by appropriately setting the capacity determined by the depth and the like of those oil sumps 35.

The lubricating oil that overflowed the middle oil sumps 35 and the lubricating oil that was not captured in those oil sumps 35 is led to the oil path 34, where it continues to run down and collect in the bottom oil sumps 35 of the oil path 34. Lubricating oil that runs in from the inner peripheral end portion side of the partition portion 30 is also collected in the bottom oil sumps 35. The lubricating oil is then supplied to the pinion bearings 27 at the bottom portion from the oil sumps 35 through the oil holes 28 so as to lubricate the pinion bearings 27. As a result, lubricating oil is supplied as soon as the system that includes the planetary gearset 11 is operated, so there is no lack of lubrication even at the bottom pinion bearings 27.

Figure 8:
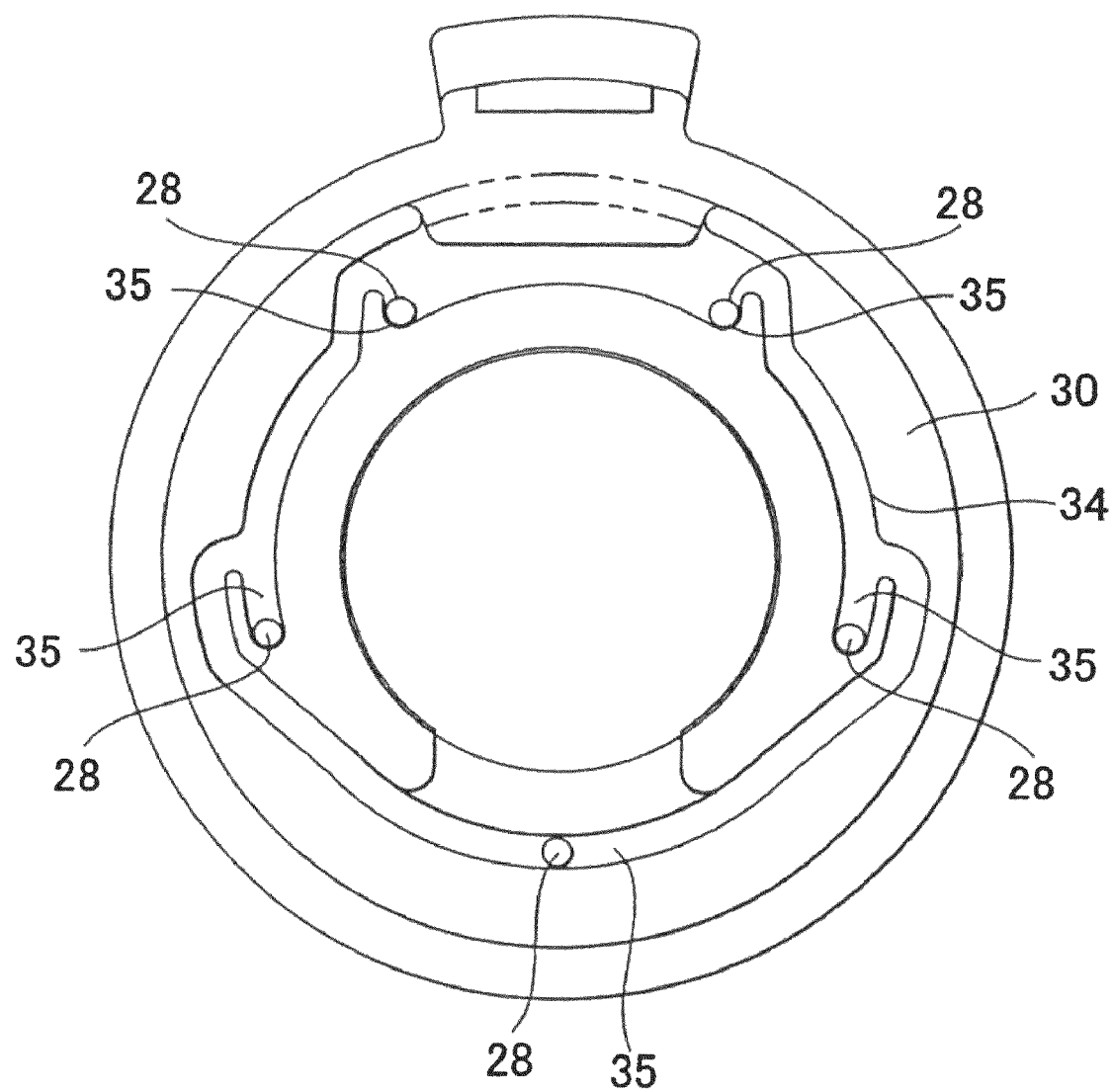
FIG. 8 is a front view showing an example of another shape of the oil path and oil sumps according to the invention.

The example shown in FIGS. 6 and 7 is of a planetary gearset 11 having one pinion pin 26 disposed at the top, which corresponds to one point of an equilateral pentagon, and the other pinion pins 26 disposed at positions corresponding to the other four points. Alternatively, however, the pinion pins 26 may be positioned at arbitrary angles, so the oil sump 35 of this invention may be provided at corresponding locations. For example, FIG. 8 shows an example of the planetary gearset 11 in which one pinion pin 26 is positioned near the bottom, as one of the points of the equilateral pentagon, and the other pinion pins 26 are positioned corresponding to the other four points. In the example shown in this figure, the lubricating oil easily enters the oil holes 28 in the two upper pinion pins 26, so the oil sumps 35 corresponding to these pinion pins 26 are formed relatively shallow. On the other hand, because the lubricating oil does not easily enter the oil holes 28 in the pinion pins 26 in the middle portion in the vertical direction, the oil sumps 35 corresponding to these pinion pins 26 are formed relatively deep so that a large amount of lubricating oil collects there.

Also, according to the foregoing specific example, the oil sumps 35 positioned in the middle portion in the vertical direction are formed branching off from the oil path 34. However, the shape of the oil sumps 35 according to this invention is not limited to that. That is, the depth (the dimensions in the left-right direction in FIG. 6) of the groove formed as the oil path, for example, may be made greater at the location corresponding to the pinion pins 26 so that the oil sump 35 according to the invention forms a so-called shelf portion. Above this shelf portion flow resistance against the lubricating oil running down is low, while below this shelf portion the flow resistance is high. As a result, the lubricating oil tends to collect at the shelf portion. Therefore, this shelf portion may also be used as an oil sump.

Although the carrier 15 and the partition portion 30, which forms the oil path 34, contact each other, they are not integrally formed. Therefore, the it is possible that the lubricating oil led to the oil sump 35 may leak from between the carrier 15 and the partition portion 30. To prevent this, it is preferable that a spacer 37 be disposed between the carrier 15 and the partition portion 30.

Figure 9:
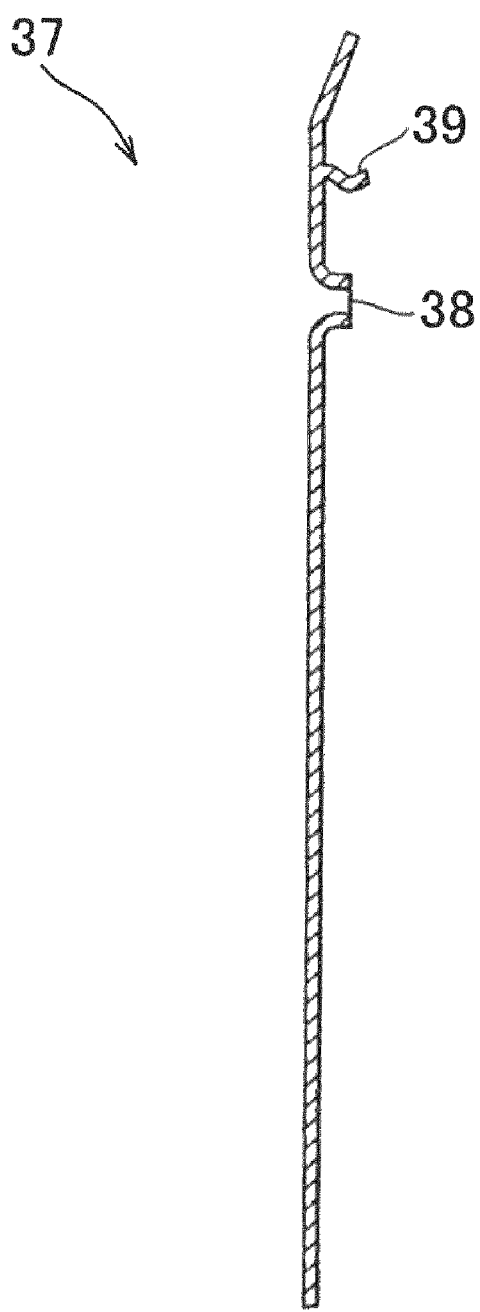
FIG. 9 is a cross-sectional view showing one example of a spacer that can be used in the invention.
Figure 10:
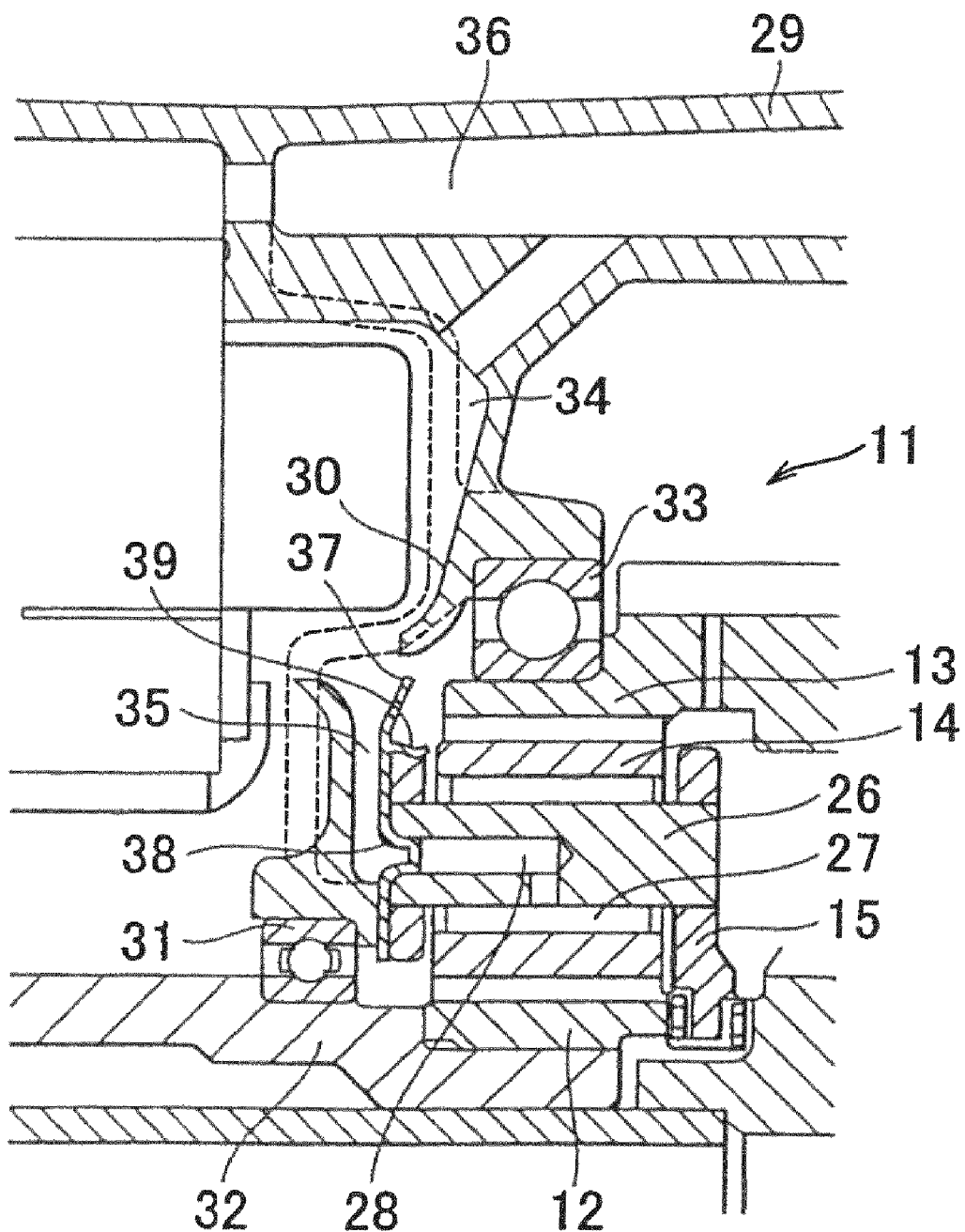
FIG. 10 is a cross-sectional view showing one example of the invention in which the spacer in FIG. 9 is used.

FIG. 9 shows one example of this spacer 37, and FIG. 10 shows one example of the spacer 37 attached. That is, the spacer 37 shown here is a substantially circular disc-shaped member that is tightly attached to the side face of the partition portion 30 in which the oil path 34 is formed, which covers the oil path 34. Cylindrical protruding portions 38 that insert into the oil holes 28 are formed in locations corresponding to the oil holes 28 in the pinion pins 26. Further, a clamp piece 39 which engages with the outer peripheral surface of one of the circular disc members included in the carrier 15 is integrally provided with the spacer 37. This clamp piece 39 is, for example, a disc spring-shaped portion in which a portion of the spacer 37 has been bent up, which engages with the carrier 15 by the elastic force thereof. In this state, the protruding portions 38 are inserted into the oil holes 28. Further, the upper portion of the spacer 37 curves away from the side face of the partition portion 30 so as to actively lead the lubricating oil between the spacer 37 and the partition portion 30.

Accordingly when the spacer 37 is used, it is sandwiched between the carrier 15 and the partition portion 30, thereby substantially closing off the portion below the oil sump 35. As a result, leaking of the lubricating oil from the oil sump 35 is eliminated or minimized. Furthermore, because the protruding portion 38 actively leads the lubricating oil to the oil holes 28, it is possible to supply the pinion bearings 27 with a sufficient amount of lubricating oil.

Figure 11:
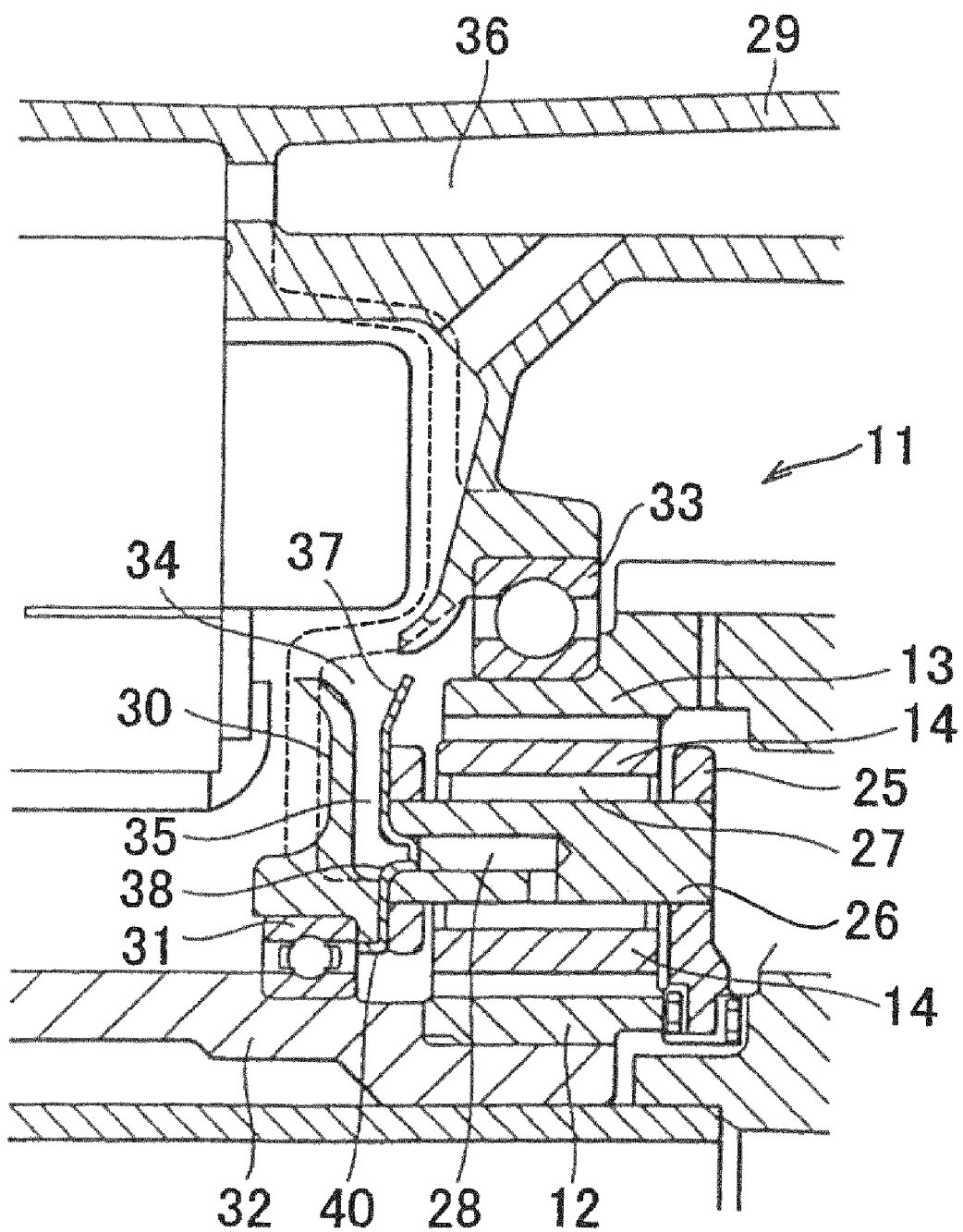
FIG. 11 is a cross-sectional view showing an example in which the spacer in FIG. 9 is attached to a partition portion.

The spacer 37 is used to close off the open end of the oil path 34 at the side face of the partition portion 30, so it is preferable that the spacer 37 be attached to the partition portion 30 rather than to the carrier 15. FIG. 11 shows an example of this. In the example shown here, a clamp piece 40 that protrudes on the side opposite the protruding portion 38 is formed on the inner peripheral end portion of the spacer 37. The spacer 37 attaches to the partition portion 30 by the clamp piece 40 engaging with the edge portion of the inner peripheral surface of the partition portion 30.

Therefore, according to the configuration shown in FIG. 11, the spacer 37 reliably attaches tightly to the side face of the partition portion 30 such that the leakage of the lubricating oil from the oil sump 35 can be eliminated or minimized.

Furthermore, the spacer 37 is provided with a plurality of the protruding portions 38 which fit into the oil holes 28 so as to position the spacer 37 with respect to, as well as attach it to, the carrier 15. Accordingly, the operation of positioning the spacer 37 with respect to the carrier 15 by the protruding portions 38 and tightly attaching the spacer 37 to the partition portion 30 may be done by an elastic member interposed between the carrier 15 and the partition portion 30. For example, as shown in FIG. 12, elastic pieces 41 that protrude in the same direction as do the protruding portions 38, i.e., toward the carrier 15 side, may be formed in a plurality of locations on the inner peripheral edge of the spacer 37, such that these elastic pieces 41 push on the side face of the carrier 15, and the reaction force therefrom pushes the spacer 37 against the partition portion 30.

Figure 13:
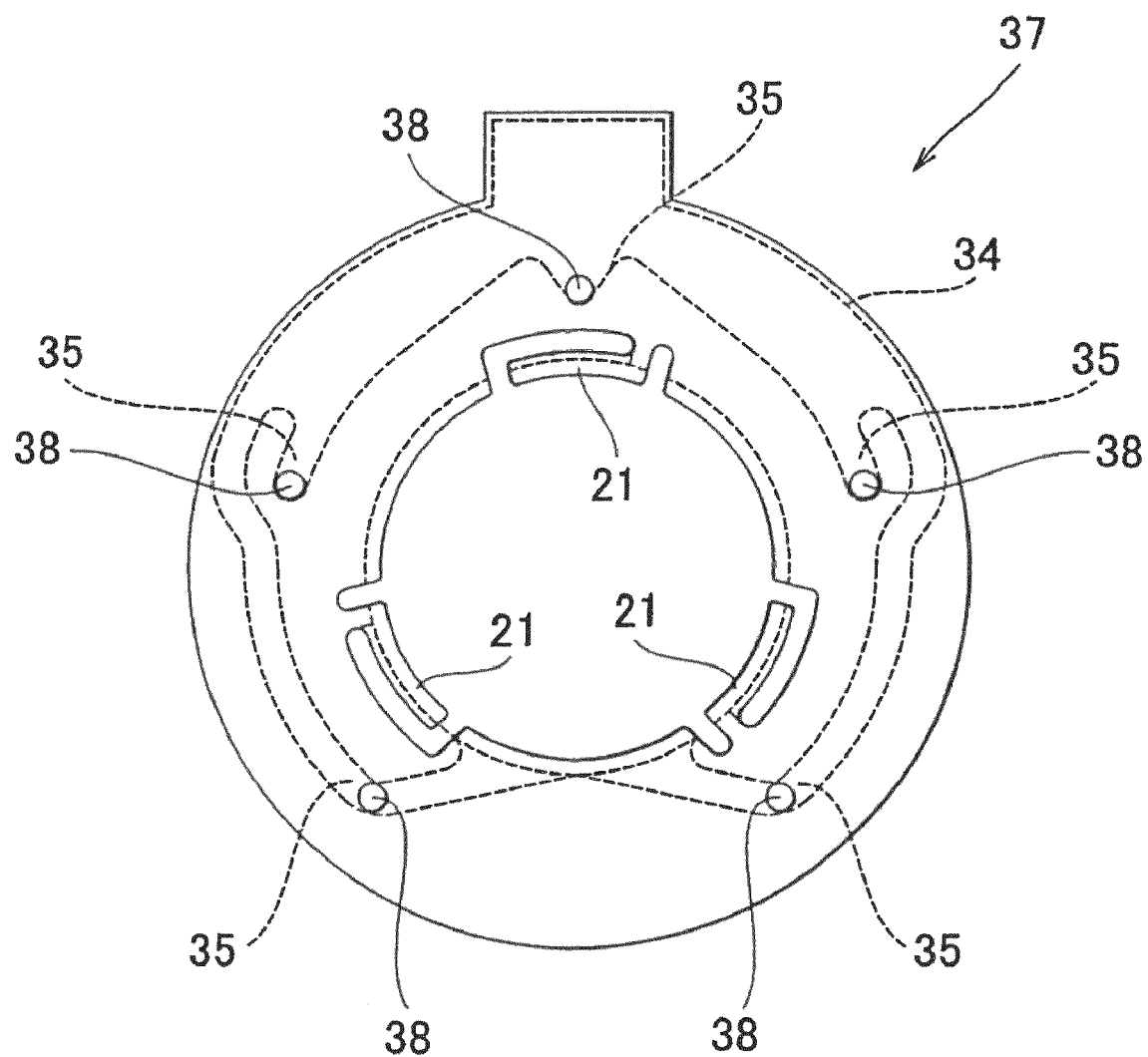
FIG. 13 is a front view of a spacer, which shows another shape of the elastic piece provided on the spacer in FIG. 12.
Figure 14:
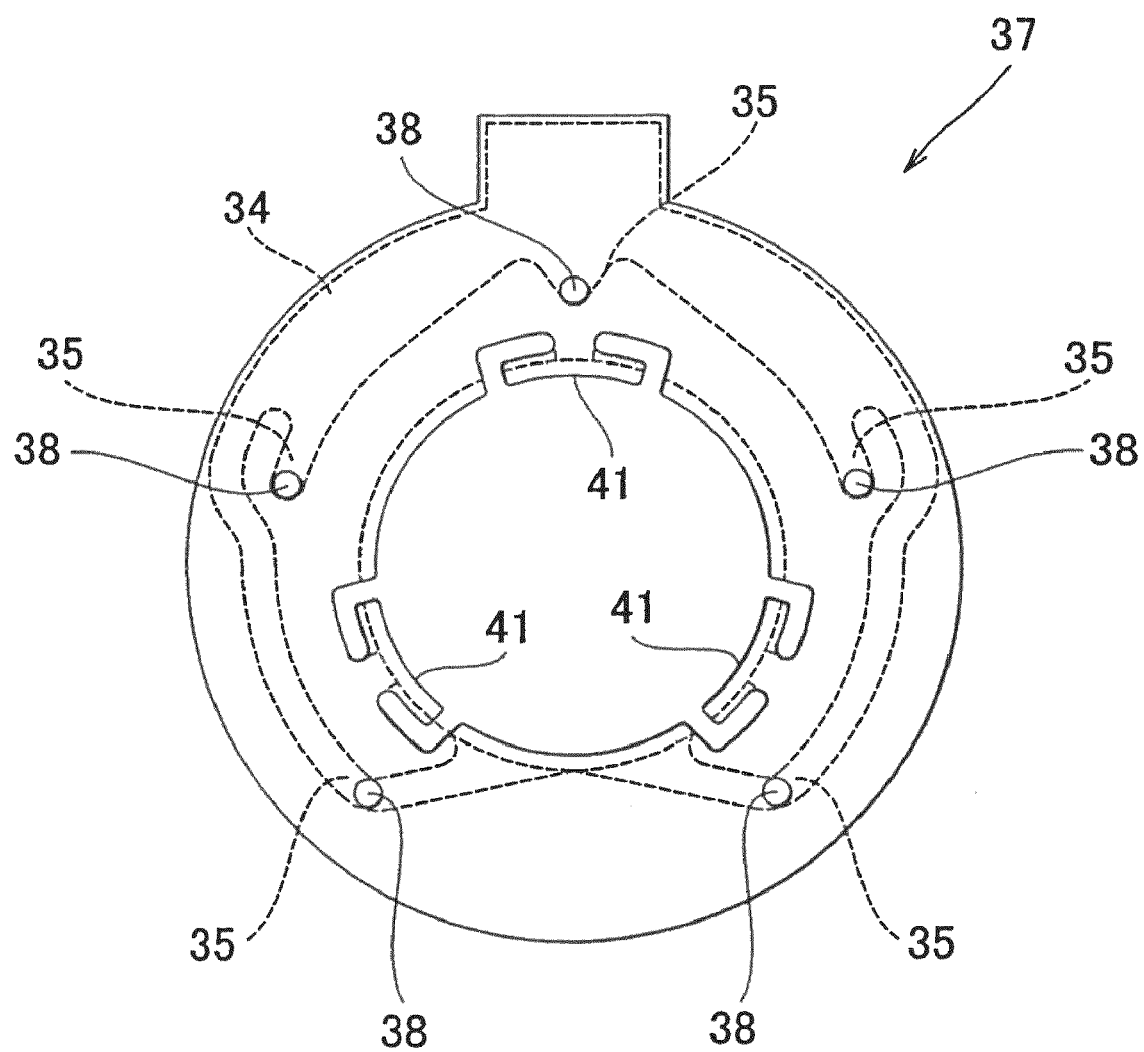
FIG. 14 is a front view of a spacer, which shows yet another shape of the elastic piece provided on the spacer in FIG. 12.

These elastic pieces 41 can be made an appropriate shape as necessary. For example, the elastic pieces 41 may have a variety of shapes such as an arc-shaped cantilever that extends in the circumferential direction, as shown in FIG. 13. Alternatively, the elastic pieces 41 may be T-shaped, with the left and right free end portions protruding in the same direction as the protruding portion 38 and able to bend flexibly, as shown in FIG. 14.

Moreover, the oil paths and oil sumps according to this invention are not limited to the specific examples. For example, the oil sump 35 may also be formed having a kind of funnel-shaped cross-section, with the lower end portion, which is cylindrical in shape, going into the oil hole 28.

The invention is not limited to the lubrication system for the foregoing single pinion type planetary gearset, but can be applied to a lubrication system for a double pinion type planetary gearset or another type of planetary gearset such as a Ravigneaux type planetary gearset.

According to the foregoing exemplary embodiment of the invention, even in a pinion bearing arranged to be relatively high by fixing the carrier, lubricating oil is able to collect in the oil sump that is provided in a relatively high location corresponding to that pinion bearing, and lubricating oil is supplied from there. As a result, lubricating oil is supplied to the pinion bearing located relatively high quickly after lubricating oil starts to be supplied to the oil path, such that that bearing is able to be sufficiently lubricated as required. Also, the speed with which the lubricating oil collects and the amount collected differ depending on the shape of each of the oil sumps. As a result, lubricating oil at a speed and of an amount according to the particular shape of the oil sump can be supplied to each pinion bearing through the oil hole in the pinion pin arranged corresponding to each oil sump. As a result, even if the carrier is fixed, it is possible to lubricate the pinion bearings sufficiently and without delay.

Next, a lubrication system 101 of the planetary gearset shown in the first through the third exemplary embodiments will be described. In particular, an exemplary embodiment of the lubrication system 101 that supplies lubricating oil to the reservoir and then supplies the lubricating oil to portions requiring lubrication such as the pinion bearings 27 of the planetary gearset, as shown in the third exemplary embodiment, will be described with reference to the drawings.

Fourth Embodiment

Figure 16:
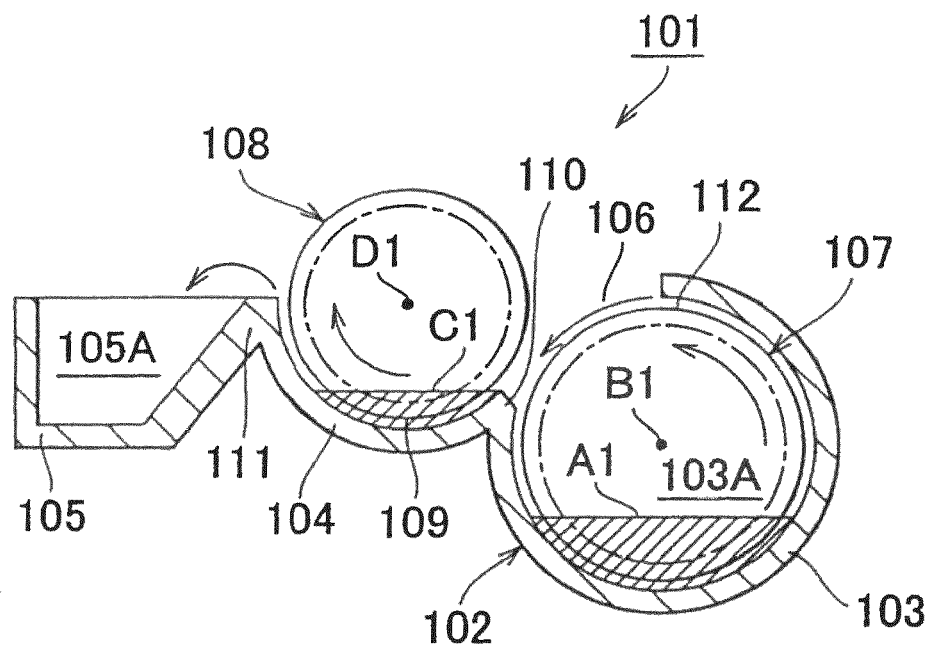
FIG. 16 is a cross-sectional view showing a fourth exemplary embodiment of the invention.

The lubrication system 101 shown in FIG. 16 has a container (i.e., a tray) 102. This container (tray) 102 has a first retaining portion 103, a second retaining portion 104, and an oil reservoir 105. First, the first retaining portion 103 has a cross section in the height direction that is substantially arc-shaped. The first retaining portion 103 is formed over an area of approximately 270 degrees, with an opening 106 formed between both ends of the first retaining portion 103 in the circumferential direction. A lubricating oil sump A1 is formed in an inner portion 103A of the first retaining portion 103, where a first gear 107 is also arranged. A portion of this first gear 107 is submersed in the lubricating oil sump A1. The first gear 107 rotates counterclockwise around a rotation axis B1.

The second retaining portion 104 has a cross section in the height direction that is substantially arc-shaped. The second retaining portion 104 is formed over an area of approximately 120 degrees. A connecting portion 110 is formed where one end of the second retaining portion 104 in the circumferential direction is connected with one end of the first retaining portion 103. A lubricating oil sump C1 is formed on the recessed side (i.e., the upper surface side) of the second retaining portion 104, where a second gear 108 is also arranged. The second gear 108 is attached to a second rotating shaft (not shown), which rotates clockwise around a rotation axis D1. A lower edge portion 109 on the outer periphery of the second gear 108 is disposed lower than the upper edge of the connecting portion 110. Accordingly, a portion of the outer periphery of the second gear 108 is submersed in the lubricating oil sump C1. It should be noted that the first gear 107 and the second gear 108 are not engaged. Moreover, the first rotating shaft and the second rotating shaft are both horizontal and both rotate around a parallel axis (not shown). Power is transmitted between the first rotating shaft and the second rotating shaft by a transmitting member (not shown).

The oil reservoir 105 has a cross-sectional shape in the height direction of an upside-down trapezoid with a bottom side, a right side, and a left side. A connecting portion 111 is formed where one end of the oil reservoir 105 and one end of the second retaining portion 104 are connected. The height of an upper edge portion 112 of the first gear 107 is set to a height between the rotation axis D1 and the upper edge of the connecting portion 110. Further, the first gear 107 and the second gear 108 are arranged in substantially the same location in the axial direction on the first rotating shaft and the second rotating shaft, respectively. Also, the height of the rotation axis D1 and the height of the upper edge of the connecting portion 111 are set to be substantially the same. Moreover, the opening 106 is arranged between the rotation axis B1 and the rotation axis D1. That is, the opening 106 is arranged between the first gear 107 and the second gear 108.

In the lubrication system 101 of the above configuration, the first gear 107 and the second gear 108 rotate following the transmission of power between at least one of an engine and an electric motor, and wheels. The lubricating oil collected in the lubricating oil sump A1 is sent in the circumferential direction while adhering to the first gear 107 and thrown toward the outside of the first gear 107 by centrifugal force as the first gear 107 rotates counterclockwise.

Some of the lubricating oil thrown off in this way is thrown through the opening 106 and toward the top face of the second retaining portion 104. Once above the second retaining portion 104, the lubricating oil then naturally runs down and forms the lubricating oil sump C1. When this happens, the lubricating oil in the lubricating oil sump C1 is then kicked up by the second gear 108 and thrown upward by centrifugal force, after which it then naturally comes down and is collected in an inner portion 105A of the oil reservoir 105. The lubricating oil sent to the inner portion 105A of the oil reservoir 105 is then sent to portions requiring lubrication, such as an electric motor, a generator, engaging portions of gears, and bearings, via an oil path (not shown). The portions requiring lubrication are then lubricated and cooled by the lubricating oil. Accordingly, overheating and wear and the like of portions requiring lubrication is suppressed, thus improving the durability and extending the life of those portions.

In this way, according to the exemplary embodiment shown in FIG. 16, the lubricating oil from the lubricating oil sump A1 is supplied to the portions requiring lubrication in a plurality of steps, the first being the transfer of the lubricating oil by rotation of the first gear 107, and the second being the transfer of the lubricating oil by rotation of the second gear 108. Accordingly, even if the first retaining portion 103 is separated from the oil reservoir 105, a reduction in the amount of lubricating oil supplied to the oil reservoir 105 is able to be suppressed. Therefore, the layout with respect to relative positions of the oil reservoir 105 and the first gear 107 in the height direction is not restricted, thereby increasing the degree of freedom.

Also, because the lubricating oil transferred by the first gear 107 is received by the second gear 108 and then supplied to the oil reservoir 105, the lubricating oil can be supplied to the oil reservoir 105 when the oil reservoir 105 is separated from the first gear 107, regardless of the rotation speed of the first gear 107. In other words, the amount of lubricating oil supplied to the oil reservoir 105 can be ensured without increasing the surface area of the first gear 107 that is submersed in the lubricating oil sump A1. As a result, an increase in power loss between the rotating shafts is able to be suppressed.

Still further, the lubricating oil can be supplied to the oil reservoir 105 from above the upper edge of the connecting portion 111 that is higher than the upper edge 112 of the first gear 107. Moreover, because the lubricating oil is retained by the teeth grooves formed between the teeth of the second gear 108, it is possible to improve the lubricating oil retaining function of the second gear 108.

Here, with respect to the corresponding relationship between the structures of the exemplary embodiment shown in FIG. 16 and the structures of this invention, the first gear 107 corresponds to the first rotating body of this invention, the oil reservoir 105, electric motor, generator, engaging portions between gears, bearings, and the like correspond to portions requiring lubrication of this invention, the second gear 108 corresponds to the second rotating body of this invention, the lubricating oil sump C1 corresponds to the middle lubricating oil sump of this invention, the teeth grooves between each of the teeth formed on the outer periphery of the second gear 108 correspond to recessed portions of the invention, the upper edge of the connecting portion 111 corresponds to the upper edge of one of the portions requiring lubrication of the invention, the first rotating shaft and the second rotating shaft and the like correspond to rotating members for transmitting power, and the lubricating oil sump A1 corresponds to the main lubricating oil sump of the invention.

Fifth Embodiment

Figure 17:
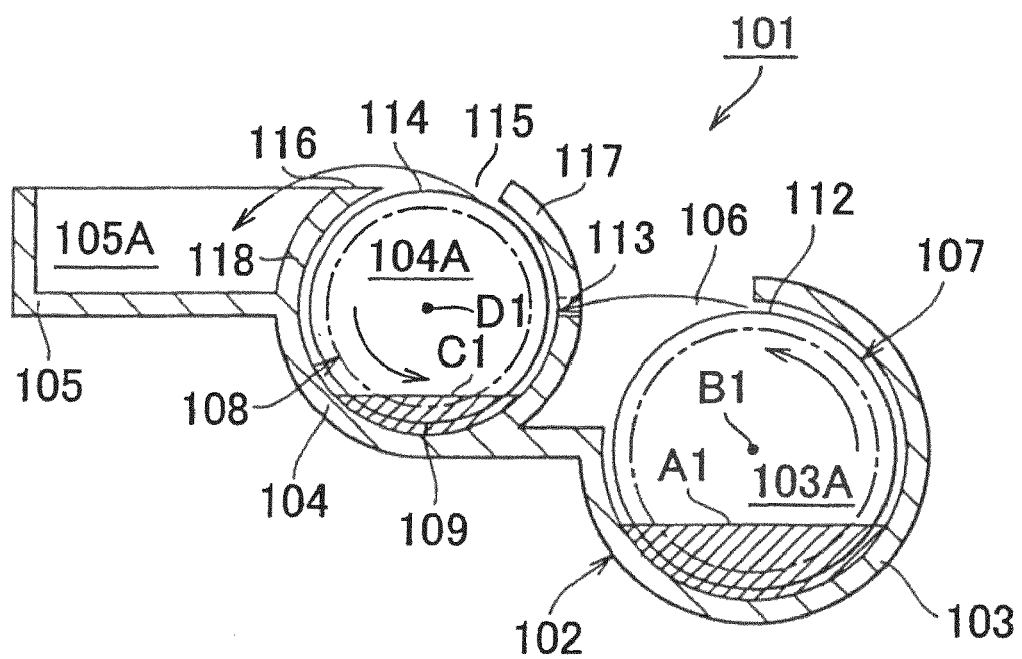
FIG. 17 is a cross-sectional view showing a fifth exemplary embodiment of the invention.

Structures of the lubrication system 101 shown in FIG. 17 which are the same as those in the lubrication system 101 shown in FIG. 16 shall be denoted by the same reference numerals used in FIG. 16, and descriptions thereof will be omitted. In FIG. 17 the second retaining portion 104 is formed in an arc shape over an area of 300 degrees or more. The second retaining portion 104 has a first arc-shaped portion 117 near the opening 106. A passage 113 is formed in a location in the second retaining portion 104 closest to the opening 106, i.e., in the first arc-shaped portion 117. This passage 113 passes through the second retaining portion 104 in the direction of thickness. The passage 113 and the upper edge 112 of the first gear 107 are arranged to be at substantially the same height.

Also, an opening 115 is formed in the second retaining portion 104 in a location corresponding to an upper edge 114 of the second gear 108. The opening 115 is formed between the first arc-shaped portion 117 and the second arc-shaped portion 118. In the exemplary embodiment shown in FIG. 17, the second arc-shaped portion 118 serves as both a portion of the second retaining portion 104 in the circumferential direction, as well as a portion of the oil reservoir 105. An upper edge 116 of the second arc-shaped portion 118 is positioned higher than the upper edge 114 of the second gear 108.

According to the exemplary embodiment shown in FIG. 17, when the first rotating shaft and the second rotating shaft are rotated, the first gear 107 and the second gear 108 both rotate counterclockwise. Here, the rotation speed of the second gear 108 is faster than that of the first gear 107. The lubricating oil kicked up by the rotation of the first gear 107 is thrown through the opening 106 toward the outer face of the second retaining portion 104. Some of this lubricating oil that is thrown toward the outer face of the second retaining portion 104 passes through the passage 113 and runs into an inner portion 104A of the second retaining portion 104.

In this way, the lubricating oil sump C1 forms in the inner portion 104A of the second retaining portion 104. The lubricating oil in the lubricating oil sump C1 is kicked up by the rotation of the second gear 108 and thrown by centrifugal force through the opening 115 so that it passes over the upper edge 116 and into the oil reservoir 105. Therefore, the component parts in the fifth exemplary embodiment that are the same as those in the fourth exemplary embodiment provide the same operation and effects obtained in the fourth exemplary embodiment.

Sixth Embodiment

Figure 18:
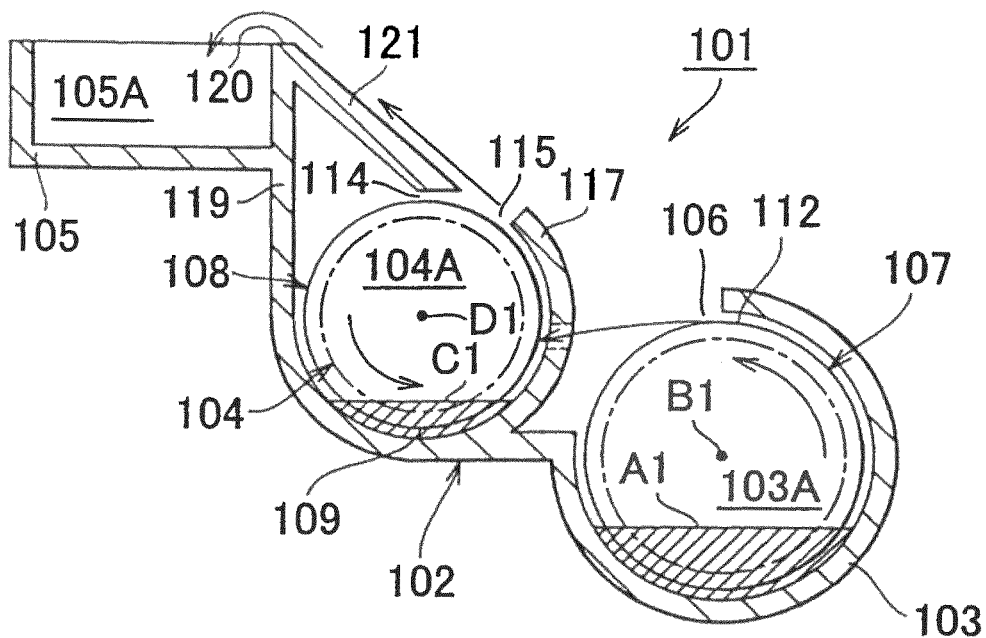
FIG. 18 is a cross-sectional view showing a sixth exemplary embodiment of the invention.

The structures of the lubrication system 101 shown in FIG. 18 that are the same as those in the exemplary embodiment shown in FIGS. 16 and 17 shall be denoted by the same reference numerals as in FIGS. 16 and 17, and descriptions thereof will be omitted. The second retaining portion 104 has a wall portion 119 that extends in the height direction. This wall portion 119 serves as both a portion of the second retaining portion 104 and a portion of the oil reservoir 105. An upper edge 120 of the wall portion 119 is provided that is higher than an upper edge 114 of the second gear 108. A guide member 121 that extends toward the upper edge 114 of the second gear 108 is continuous from the upper edge 120 of the wall portion 119. The guide member 121 is plate shaped, with an top face thereof slanting downward toward the upper edge 114 of the second gear 108. The opening 115 is formed between the free end of the guide member 121 and the end portion of the first arc-shaped portion 117 in the circumferential direction.

In the sixth exemplary embodiment as well, when the first gear 107 and the second gear 108 rotate counterclockwise, the lubricating oil sump C1 is formed by the same operation as in the second exemplary embodiment. The rotation speed of the second gear 108 is faster than that of the first gear 107, so the centrifugal force acting on the lubricating oil is also greater on the second gear 108 side than it is on the first gear 107 side. The lubricating oil thrown upward by the second gear 108 passes through the opening 115 and lands on the top face of the guide member 121. This lubricating oil then rises up the top face of the guide member 121 by the inertial force when it was thrown upward by the second gear 108 and runs into the oil reservoir 105.

The component parts in the sixth exemplary embodiment that are the same as those in the fourth and fifth exemplary embodiments provide the same operation and effects obtained in the fourth and fifth exemplary embodiments. Furthermore, in the sixth exemplary embodiment, the guide member 121 is disposed between the opening 115 and the space above the oil reservoir 105. As a result, the lubricating oil kicked up by the first gear 107 can be reliably supplied to the oil reservoir 105 regardless of the distance between the first gear 107 and the oil reservoir 105 in the height direction. The corresponding relationship between the structures of the sixth exemplary embodiment and the structures of this invention is the same as the corresponding relationship between the structures of the fourth exemplary embodiment and the structures of the invention.

Seventh Embodiment

Figure 19:
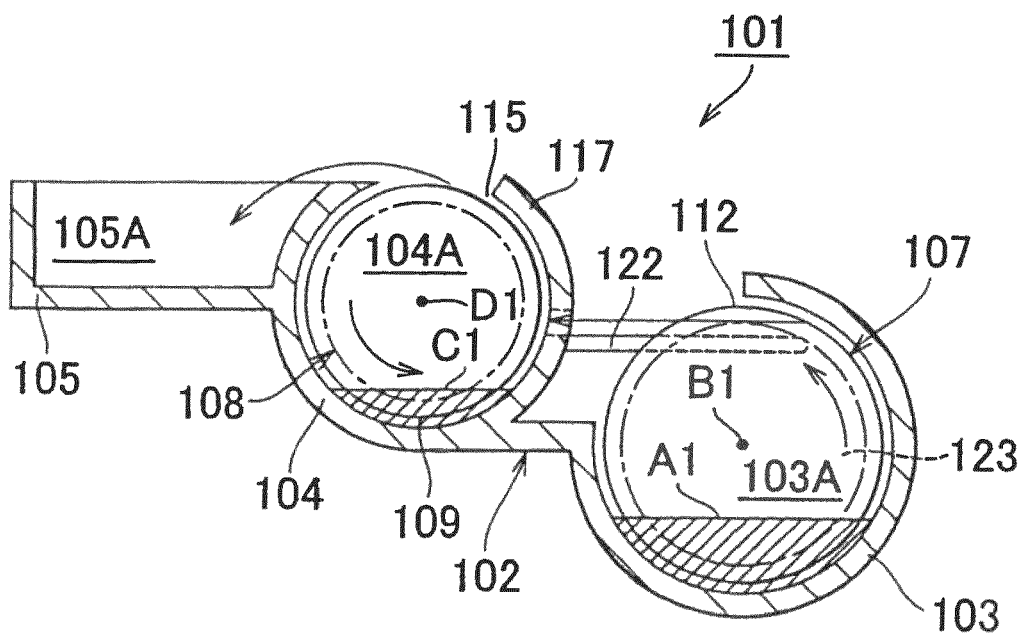
FIG. 19 is a cross-sectional view showing a seventh exemplary embodiment of the invention.

The structures of the lubrication system 101 shown in FIG. 19 that are the same as those in the exemplary embodiment shown in FIGS. 16 and 17 shall be denoted by the same reference numerals as in FIGS. 16 and 17, and descriptions thereof will be omitted. In FIG. 19, a guide member 122 is provided substantially horizontal to the side the first gear 107. The guide member 122 is plate shaped. There is a slight gap between this guide member 122 and a side face (or end face) 123 of the first gear 107. If the material of the side face 123 is of low strength (e.g., an elastomer or the like), the guide member 122 may contact the side face 123 of the first gear 107. The side face 123 of the first gear 107 refers to the face orthogonal to the axis of the first rotating shaft.

This guide member 122 is provided at a height between the upper edge 112 of the first gear 107 and the rotational axis B1. The end portion of the guide member 122 on the side opposite the first gear 107 is connected to the second retaining portion 104. The top face of the guide member 122 and the lower edge of the inner face of the passage 113 are set to be at substantially the same height. In FIG. 19, one guide member 122 is arranged on one side face 123 of the first gear 107. Alternatively, however, two of the guide members 122 may be attached separately to the side face 123 on both sides of the first gear 107.

The component parts in the exemplary embodiment shown in FIG. 19 that are the same as those in the exemplary embodiment shown in FIGS. 16 and 17 provide the same operation and effects obtained in the exemplary embodiments shown in FIGS. 16 and 17. Moreover, in the exemplary embodiment shown in FIG. 19, some of the lubricating oil kicked up by the first gear 107 is picked up by the guide member 122. More specifically, the lubricating oil that is adhered to the side face 123 of the first gear 107 is picked up by the guide member 122. This lubricating oil then moves (runs) over the top face of the guide member 122 toward the passage 113 by inertial force when it comes off of the first gear 107. After passing through the passage 113, the lubricating oil runs into the inner portion 104A of the second retaining portion 104, from which it is transferred to the oil reservoir 105 as described above.

Figure 15:
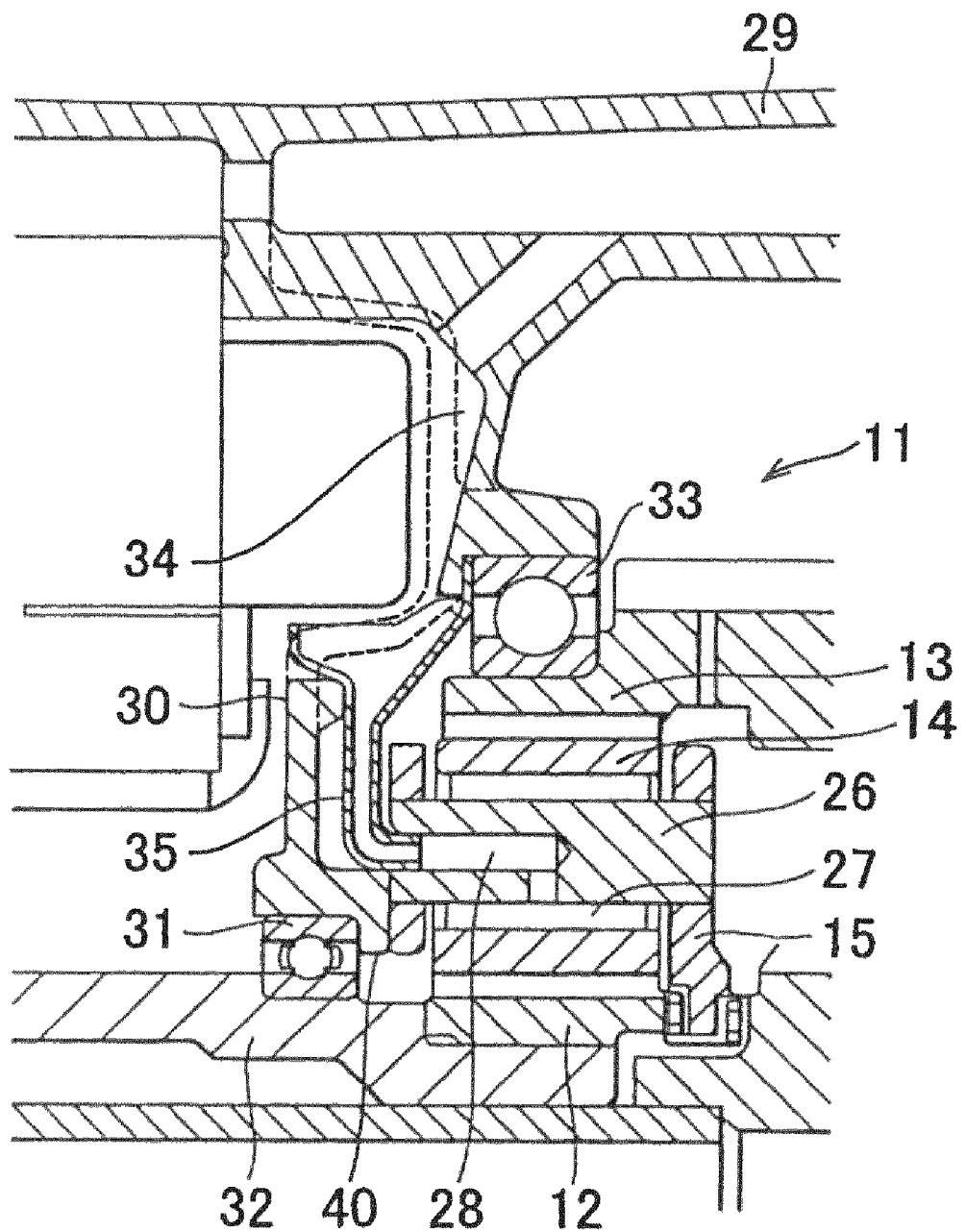
FIG. 15 is a cross-sectional view showing one example in which the oil sump is funnel shaped.

Also, in the exemplary embodiment shown in FIG. 19, if the first gear 107 rotates at high speed, the lubricating oil thrown off by centrifugal force passes through the passage 113 and runs into the inner portion 104A of the second retaining portion 104. On the other hand, if the first gear 107 rotates at low speed such that the lubricating oil thrown upward by centrifugal force does not reach the passage 113, the lubricating oil adhered to the first gear 107 by viscosity and shearing resistance is then picked up by the side face 123 and transferred to the oil reservoir 105. Accordingly, it is possible to ensure the amount of lubricating oil supplied to the oil reservoir 105 regardless of the rotation speed of the first gear 107 (as long as the first gear 107 is not stopped). Providing two of the guide members 122 further increases the amount of lubricating oil picked up from the first gear 107. The corresponding relationship between the structures shown in FIG. 19 and the structures of this invention is the same as the corresponding relationship between the structures shown in FIG. 15 and the structures of this invention.

Eighth Embodiment

Figure 20:
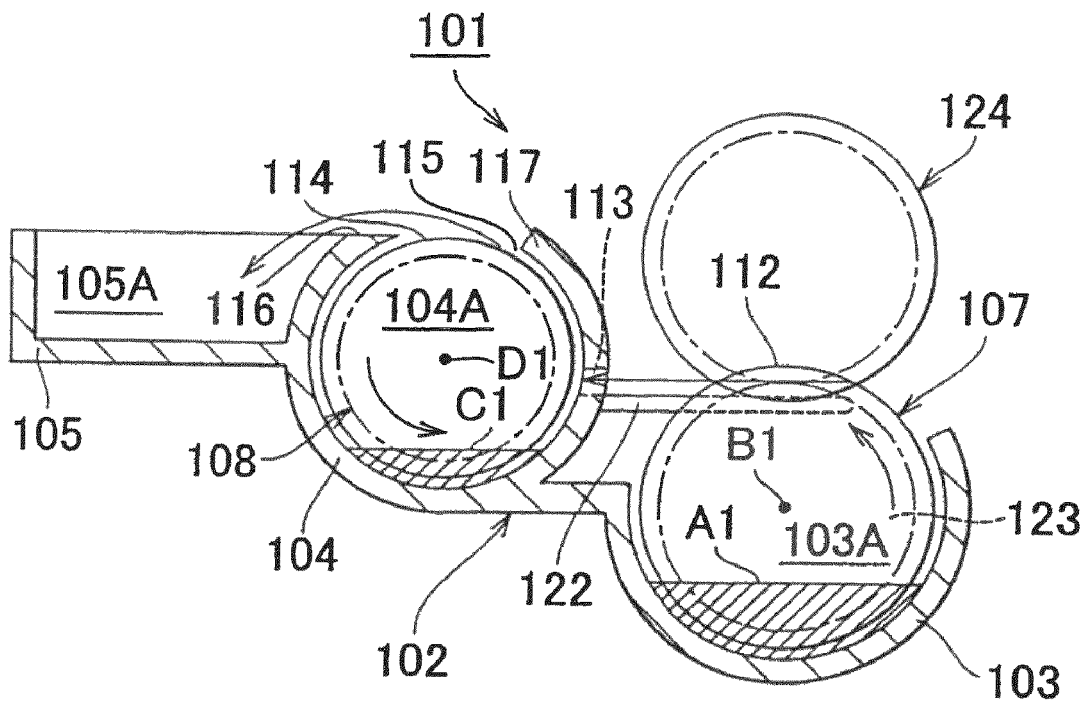
FIG. 20 is a cross-sectional view showing an eighth exemplary embodiment of the invention.

The structures of the lubrication system 101 shown in FIG. 20 that are the same as those in the exemplary embodiment shown in FIGS. 16 and 19 shall be denoted by the same reference numerals as in FIGS. 16 and 19, and descriptions thereof will be omitted. In the exemplary embodiment shown in FIG. 20, a third gear 124 that engages with the first gear 107 is provided. This third gear 124 is mounted on a third rotating shaft (not shown). Further, the first gear 107 and the third gear 124 are both helical gears. In the exemplary embodiment shown in FIG. 20, as well, the first gear 107 and the second gear 108 rotate counterclockwise, and the third gear 124 rotates clockwise. The component parts in the exemplary embodiment shown in FIG. 20 that are the same as those in the exemplary embodiment shown in FIGS. 16 and 19 provide the same operation and effects obtained in the exemplary embodiments shown in FIGS. 16 and 19.

Also, in the exemplary embodiment shown in FIG. 20, because the first gear 107 and the third gear 124 are both helical gears, the contact portion, or so-called contact point, between the tooth face of the teeth of the first gear 107 and the tooth face of the teeth of the third gear 124 moves in the tooth trace direction of the teeth as the first gear 107 and the third gear 124 rotate. Therefore, the lubricating oil retained in the tooth grooves between the teeth of the first gear 107 is pushed out in the tooth trace direction of the teeth as the contact point between the teeth of the first gear 107 and the teeth of the third gear 124 moves. In other words, the lubricating oil moves from the point where engagement starts toward the point where engagement ends.

In this way, the lubricating oil that has moved in the tooth trace direction of the teeth is then pushed out onto the guide member 122. That is, in the exemplary embodiment shown in FIG. 20, the lubricating oil adhered to the side face 123 of the first gear 107, as well as the lubricating oil retained in the teeth grooves of the first gear 107 are both transferred to the inner portion 104A of the second retaining portion 104 via the top face of the guide member 122. Therefore, the amount of lubricating oil supplied to the oil reservoir 105 is able to be increased as quickly as possible.

Also, by pushing the lubricating oil retained in the teeth grooves of the first gear 107 out in the tooth trace direction, the amount of lubricating oil transferred to the guide member 122 is able to be ensured. Accordingly, even if the gap between the guide member 122 and the side face 123 of the first gear 107 is not made very narrow, the amount of lubricating oil is still able to be ensured. As well, even if the rotation speed of the first gear 107 is low, it is still possible to ensure the amount of lubricating oil transferred to the oil reservoir 105. The guide member 122 is obviously disposed near the side face 123 that is close to the point where engagement ends. With respect to the corresponding relationship between the structures of the exemplary embodiment shown in FIG. 20 and the structures of this invention, the teeth of the first gear 107 and the teeth of the third gear 124 correspond to pushing mechanisms of the invention. The corresponding relationship of the other structures of the exemplary embodiment shown in FIG. 20 and the structures of the invention is the same as the corresponding relationship between the structures of the exemplary embodiments shown in FIGS. 16 and 19 and the structures of the invention.

Ninth Embodiment

Figure 21:
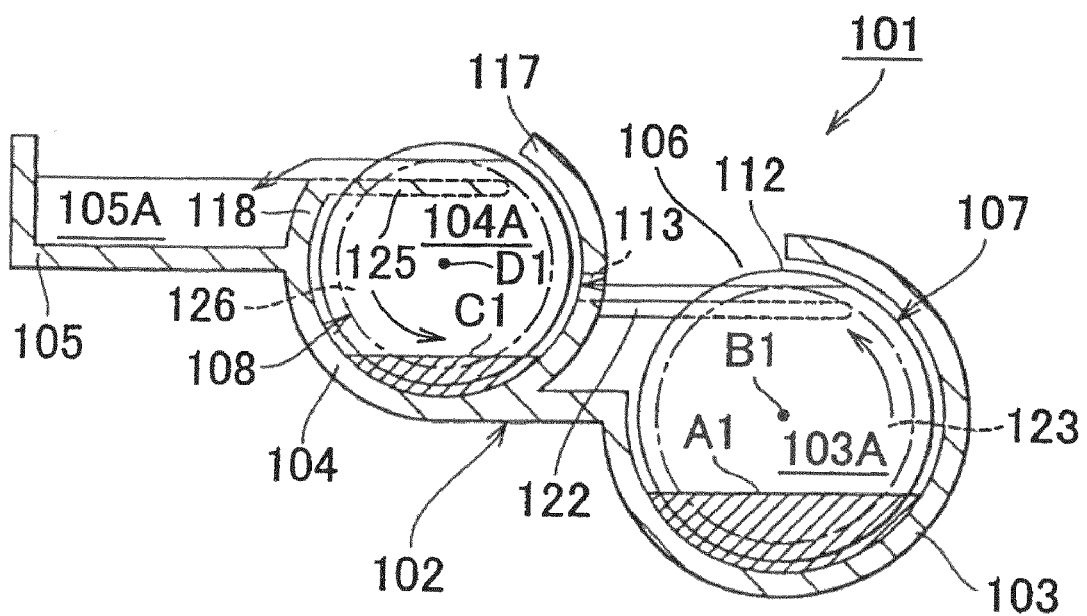
FIG. 21 is a cross-sectional view showing a ninth exemplary embodiment of the invention.

A ninth exemplary embodiment of the invention is shown in FIG. 21. The structures of the lubrication system 101 shown in FIG. 21 that are the same as those in the exemplary embodiment shown in FIGS. 16, 17, and 19 shall be denoted by the same reference numerals as in FIGS. 16, 17, and 19, and descriptions thereof will be omitted. In the exemplary embodiment shown in FIG. 21, a guide member 125 continuous on from the upper edge of the second arc-shaped portion 118 of the second retaining portion 104. This guide member 125 extends to the side of the second gear 108, and there is a predetermined gap between the guide member 125 and a side face 126 of the second gear 108. Alternatively, two of the guide members 125 may be attached to the second gear 108, one guide member 125 being attached to each side face 126 of the second gear 108. The component parts in the exemplary embodiment shown in FIG. 21 that are the same as those in the exemplary embodiment shown in FIGS. 16, 17, and 19 provide the same operation and effects obtained in the exemplary embodiments shown in FIGS. 16, 17, and 19.

Also, in the exemplary embodiment shown in FIG. 21, the lubricating oil adhered to the side face 126 of the second gear 108 is picked up by the guide member 125 as the second gear 108 rotates, and the lubricating oil on the top face of the guide member 125 runs toward the oil reservoir 105 from the inertial force when it is picked up from the second gear 108. That is, in the exemplary embodiment shown in FIG. 21, both the lubricating oil adhered to the side face 123 of the first gear 107 and the lubricating oil adhered to the side face 126 of the second gear 108 are able to be transferred to the oil reservoir 105. Accordingly, the amount of lubricating oil provide to the oil reservoir 105 can be increased as quickly as possible. The corresponding relationship of the other structures of the exemplary embodiment shown in FIG. 21 and the structures of the invention is the same as the corresponding relationship between the structures of the exemplary embodiments shown in FIGS. 16, 17, and 19 and the structures of the invention.

Tenth Embodiment

Figure 22:
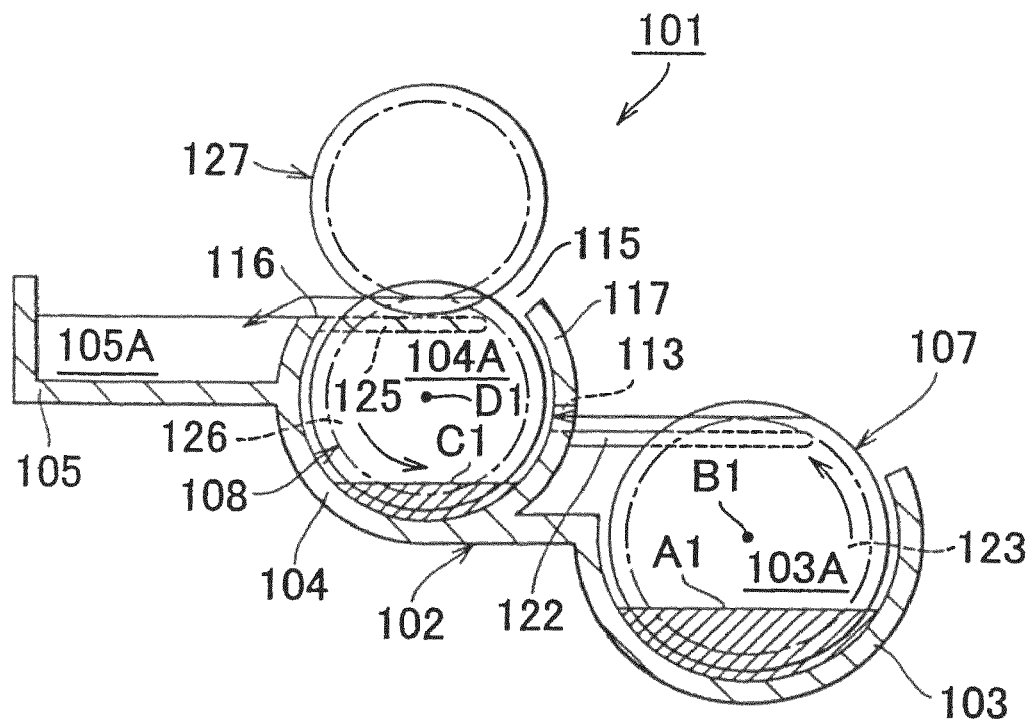
FIG. 22 is a cross-sectional view showing a tenth exemplary embodiment of the invention.

A tenth exemplary embodiment of the invention is shown in FIG. 22. The structures of the lubrication system 101 shown in FIG. 22 that are the same as those in the exemplary embodiment shown in FIGS. 16, 17, 19, and 21 shall be denoted by the same reference numerals as in FIGS. 16, 17, 19, and 21, and descriptions thereof will be omitted. In the exemplary embodiment shown in FIG. 22, a third gear 127 that engages with the second gear 108 is provided. This third gear 127 is mounted on a third rotating shaft (not shown). The second gear 108 and the third gear 127 are both helical gears. The component parts in the exemplary embodiment shown in FIG. 22 that are the same as those in the exemplary embodiment shown in FIGS. 16, 17, 19, and 21 provide the same operation and effects obtained in the exemplary embodiments shown in FIGS. 16, 17, 19, and 21.

Also, in the exemplary embodiment shown in FIG. 22, the second gear 108 rotates counterclockwise and the third gear 127 rotates clockwise. In the exemplary embodiment shown in FIG. 22, because both the second gear 108 and the third gear 127 are helical gears, the contact portion, or so-called contact point, between the tooth face of the teeth of the second gear 108 and the tooth face of the teeth of the third gear 127 moves in the tooth trace direction of the teeth as the second gear 108 and the third gear 127 rotate. Therefore, the lubricating oil retained in the tooth grooves between the teeth of the second gear 108 is pushed out in the tooth trace direction of the teeth as the contact point between the teeth of the second gear 108 and the teeth of the third gear 127 moves. In other words, the lubricating oil moves from the point where engagement starts toward the point where engagement ends.

In this way, the lubricating oil that has moved in the tooth trace direction of the teeth is then pushed out onto the guide member 125. That is, in the exemplary embodiment shown in FIG. 22, the lubricating oil adhered to the side face 126 of the second gear 108, as well as the lubricating oil retained in the teeth grooves of the second gear 108 are transferred to the oil reservoir 105 via the top face of the guide member 125. Therefore, the amount of lubricating oil supplied to the oil reservoir 105 is able to be increased as quickly as possible.

Also, by pushing the lubricating oil retained in the teeth grooves of the second gear 108 out in the tooth trace direction, the amount of lubricating oil transferred to the guide member 125 is able to be ensured. Accordingly, even if the gap between the guide member 125 and the side face 126 of the second gear 108 is not made very narrow, the amount of lubricating oil is still able to be ensured. As well, even if the rotation speed of the second gear 108 is low, it is still possible to ensure the amount of lubricating oil transferred to the oil reservoir 105. The guide member 125 is obviously disposed near the side face 126 that is close to the point where engagement ends. With respect to the corresponding relationship between the structures of the exemplary embodiment shown in FIG. 22 and the structures this invention, the teeth of the second gear 108 and the teeth of the third gear 127 correspond to pushing mechanisms of the invention. The corresponding relationship of the other structures of the exemplary embodiment shown in FIG. 22 and the structures of the invention is the same as the corresponding relationship between the structures of the exemplary embodiments shown in FIGS. 16, 17, 19, and 21 and the structures of the invention.

Eleventh Embodiment

Figure 23:
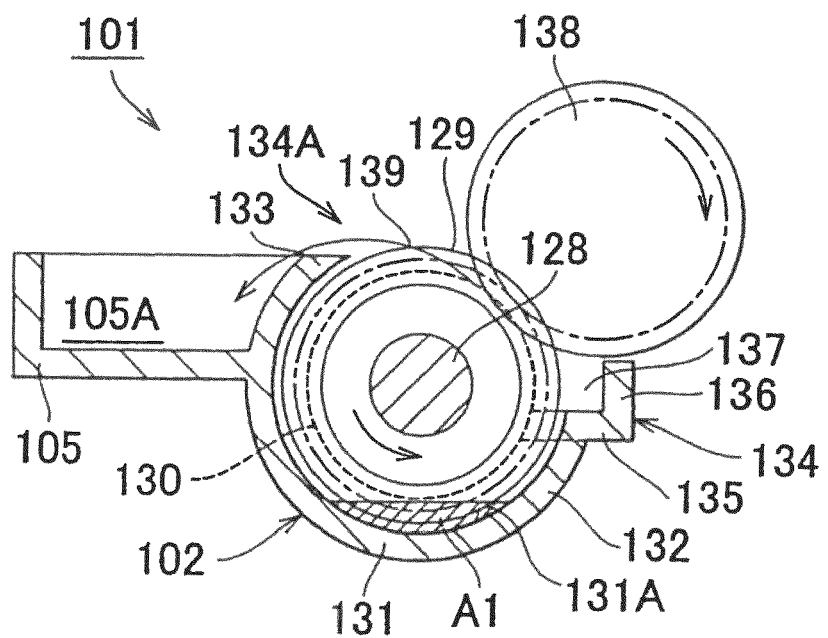
FIG. 23 is a cross-sectional view showing an eleventh exemplary embodiment of the invention.
Figure 24:
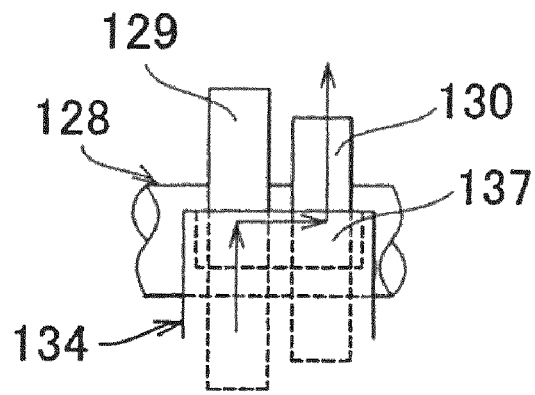
FIG. 24 is a cross-sectional view showing the eleventh exemplary embodiment of the invention.

An eleventh exemplary embodiment of the invention is shown in FIGS. 23 and 24. The container 102 disposed inside the casing has a first retaining portion 131. This first retaining portion 131 has a substantially arc-shaped cross section in the height direction. The first retaining portion 131 is formed over an area of approximately 180 degrees, and an opening 134A is formed between one end portion 132 and another end portion 133 in the circumferential direction. Further, the oil reservoir 105 is formed continuous with the first retaining portion 131. The first retaining portion 131 also serves as a portion of the oil reservoir 105.

A guide member 134 continues from the end portion 132 which, of the end portion 132 and the 133, is on the side opposite the oil reservoir 105. This guide member 134 has a horizontal portion 135 and a vertical portion 136. The horizontal portion 135 protrudes toward the outside of the first retaining portion 131. A recessed portion 137 is formed extending along the inner face of the horizontal portion 135 and the inner face of the vertical portion 136. Here, "inner face" refers to the face that faces an inner portion 131A of the first retaining portion 131. A portion of the horizontal portion 135 extends to the side of the side face of a first gear 129 on the side near a second gear 130.

Meanwhile, a rotating shaft 128 is provided inside a casing (not shown). The first gear 129 and the second gear 130 are mounted on this rotating shaft 128. The first gear 129 and the second gear 130 rotate counterclockwise in FIG. 23. The diameter of the tip circle of the teeth of the first gear 129 is larger than the diameter of the tip circle of the teeth of the second gear 130. The first gear 129 and the second gear 130 are arranged in the inner portion 131A of the first retaining portion 131. A portion of the first gear 129 is exposed to the outside through the opening 134A. Furthermore, a third gear 138 which engages with the first gear 129 is provided.

The third gear 138 is arranged above the guide member 134. The first gear 129 and the third gear 138 are both helical gears, and the contact point between the first gear 129 and the third gear 138 is between an upper edge 139 of the first gear 129 and the recessed portion 137 in the circumferential direction of the first gear 129. Also, the area in which the recessed portion 137 is provided is made to be the area that includes the first gear 129 and the second gear 130 in the axial direction of the rotating shaft 128.

In FIGS. 23 and 24, the lubricating oil in the lubricating oil sump A1 which is inside the first retaining portion 131 is kicked up by the rotation of the first gear 129. In the exemplary embodiment shown in FIGS. 23 and 24, because the first gear 129 and the third gear 138 are both helical gears, the contact portion, or so-called contact point, between the tooth face of the teeth of the first gear 129 and the tooth face of the teeth of the third gear 138 moves in the tooth trace direction of the teeth as the first gear 129 and the third gear 138 rotate. Therefore, the lubricating oil retained in the tooth grooves between the teeth of the first gear 129 is pushed out in the tooth trace direction of the teeth as the contact point between the teeth of the first gear 129 and the teeth of the third gear 138 moves. In other words, the lubricating oil moves from the point where engagement starts toward the point where engagement ends.

In this way, the lubricating oil that has moved in the tooth trace direction of the teeth runs into the recessed portion 137. The lubricating oil that has run into the recessed portion 137 then moves toward the second gear 130 side by inertial force from the movement in the tooth trace direction, and adheres to the second gear 130. The lubricating oil is then thrown upward by the centrifugal force from the rotation of the second gear 130 and runs into the oil reservoir 105.

In the eleventh exemplary embodiment, the lubricating oil is transferred in a plurality of steps, the first being the transfer of the lubricating oil by rotation of the first gear 129, and the second being the transfer of the lubricating oil by rotation of the second gear 130. Accordingly, even if the first retaining portion 131 is separated from the oil reservoir 105, a reduction in the amount of lubricating oil supplied to the oil reservoir 105 is able to be suppressed.

Also, because the lubricating oil is retained by the tooth grooves of the second gear 130, the lubricating oil retaining function of the second gear 130 is improved. Further, the lubricating oil is also temporarily retained in the recessed portion 137. Accordingly, the lubricating oil supplying function is improved even if the first gear 129 and the second gear 130 are separated by a large distance. Also, because the lubricating oil retained in the first gear 129 is pushed out in the tooth trace direction by the meshing of the first gear 129 and the second gear 130, the ability of the lubricating oil that is adhered the first gear 129 to separate therefrom is improved. Moreover, the lubricating oil is able to be supplied to the oil reservoir 105 regardless of the rotation speed of the first gear 129. Furthermore, it is possible to suppress an increase in the surface area of the first gear 129 that is submersed in the lubricating oil.

Twelfth Embodiment

Figure 25:
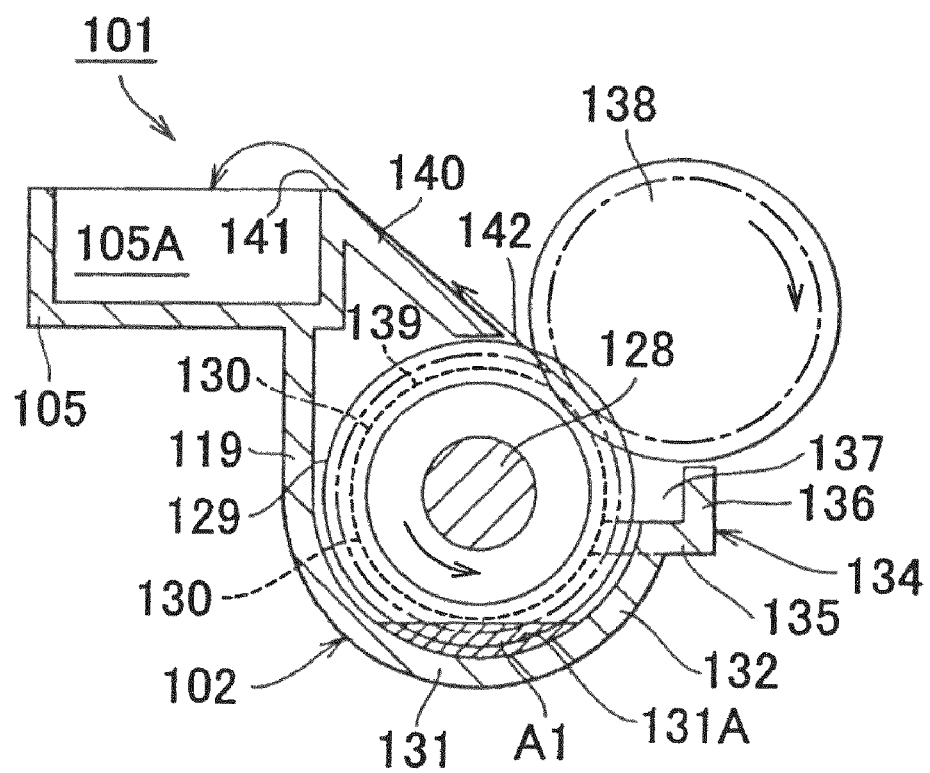
FIG. 25 is a cross-sectional view showing a twelfth exemplary embodiment of the invention.

FIG. 25 is a diagram showing another configuration of the eighth exemplary embodiment. The structures of the lubrication system 101 shown in FIG. 25 that are the same as those in the exemplary embodiment shown in FIGS. 23 and 24 shall be denoted by the same reference numerals as in FIGS. 23 and 24, and descriptions thereof will be omitted. Also, in the exemplary embodiment shown in FIG. 25, the wall portion 119 that extends in the height direction is continuous from the end portion of the first retaining portion 131 on the side opposite the end portion 132. The upper edge of the wall portion 119 continues to the bottom portion of the oil reservoir 105. A guide member 140 that extends toward the upper edge 139 of the second gear 130 continues from an upper edge 141 of the oil reservoir 105. The guide member 140 is plate-shaped, with the top face slanted downward toward the upper edge 139 of the second gear 130. The upper edge 139 is higher than the upper edge 142 of the first gear 129.

The component parts in the twelfth exemplary embodiment that are the same as those in the eleventh exemplary embodiment provide the same operation and effects obtained in the eleventh exemplary embodiment shown in FIG. 23. Further, in the twelfth exemplary embodiment, the rotation speed of the second gear 130 is faster than that of the first gear 129. The lubricating oil retained by the second gear 130 is then thrown upward by centrifugal force and moves up along the top face of the guide member 140, after which it passes over the upper edge 141 and runs into the inner portion 105A of the oil reservoir 105. In this way, according to the twelfth exemplary embodiment, because the guide member 140 is provided, the lubricating oil clears the upper edge 141 that is higher than the upper edge 142 of the first gear 129, and is transferred to the oil reservoir 105. Accordingly, it is possible to reliably supply lubricating oil to the oil reservoir 105 when that oil reservoir 105 is higher than the upper edge 142 of the first gear 129.

Thirteenth Embodiment

Figure 26:
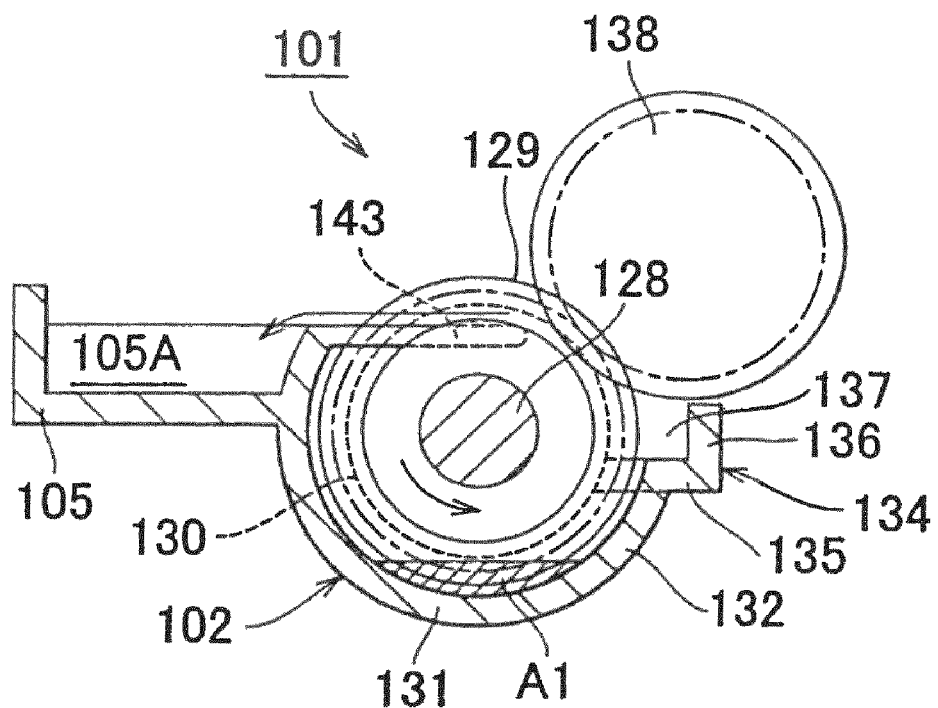
FIG. 26 is a cross-sectional view showing a thirteenth exemplary embodiment of the invention.
Figure 27:
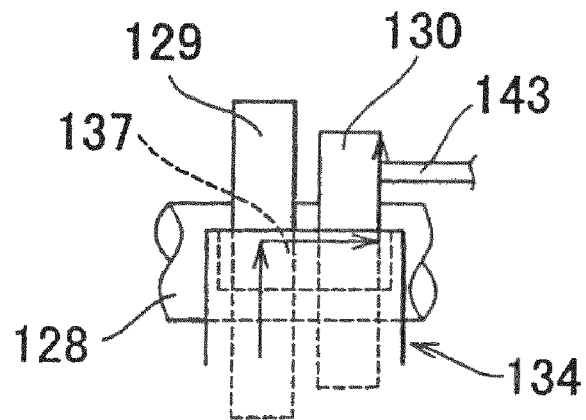
FIG. 27 is a cross-sectional view showing the thirteenth exemplary embodiment of the invention.

A thirteenth exemplary embodiment is shown in FIGS. 26 and 27. The structures shown in FIGS. 26 and 27 that are the same as those shown in FIGS. 23 and 24 shall be denoted by the same reference numerals as in FIGS. 23 and 24, and descriptions thereof will be omitted. In the thirteenth exemplary embodiment, a guide member 143 continues from a portion of the first retaining portion 131 that also serves as a portion of the oil reservoir 105. This guide member 143 is plate-shaped and extends substantially horizontal. The component parts in the thirteenth exemplary embodiment that are the same as those in the eleventh exemplary embodiment provide the same operation and effects obtained in the eleventh exemplary embodiment. Further, lubricating oil adhered to the side face of the second gear 130 is picked up by the guide member 143 and moved along the top face of the guide member 143, whereby it is supplied to the oil reservoir 105. Accordingly, it is possible to increase the amount of lubricating oil supplied to the oil reservoir 105 as quickly as possible.

Fourteenth Embodiment

Figure 28:
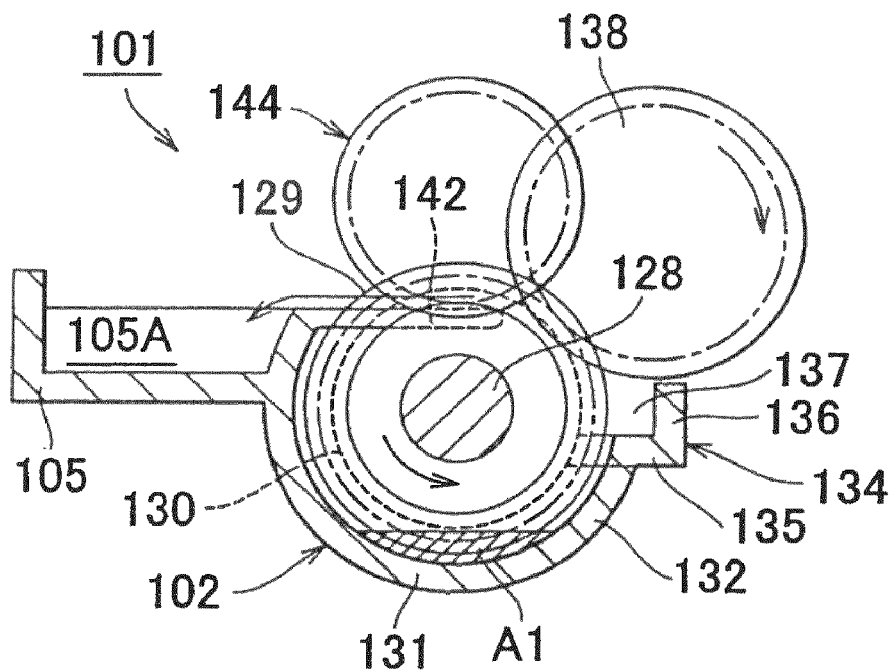
FIG. 28 is a cross-sectional view showing a fourteenth exemplary embodiment of the invention.
Figure 29:
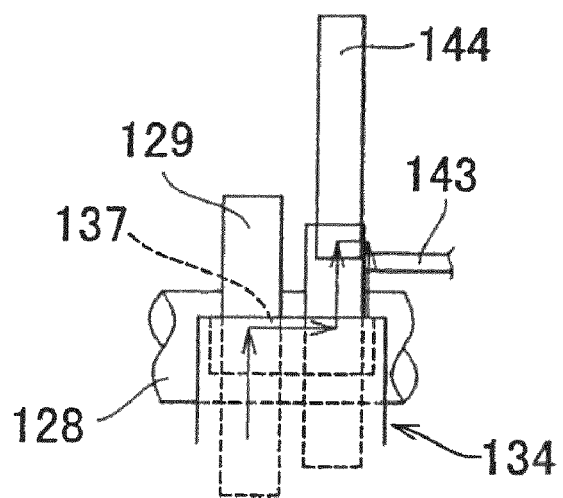
FIG. 29 is a cross-sectional view showing the fourteenth exemplary embodiment of the invention.

A fourteenth exemplary embodiment is shown in FIGS. 28 and 29. The structures shown in FIGS. 28 and 29 that are the same as those shown in FIGS. 26 and 27 shall be denoted by the same reference numerals as in FIGS. 26 and 27, and descriptions thereof will be omitted. In the fourteenth exemplary embodiment, the second gear 130 is engaged with a fourth gear 144. The second gear 130 and the fourth gear 144 are both helical gears. The area where the second gear 130 and the fourth gear 144 engage is above the top face of the guide member 143. The component parts in the fourteenth exemplary embodiment that are the same as those in the thirteenth exemplary embodiment provide the same operation and effects obtained in the thirteenth exemplary embodiment.

Also, in the fourteenth exemplary embodiment, because the second gear 130 and the fourth gear 144 are both helical gears, the contact point between the tooth face of the teeth of the second gear 130 and the tooth face of the teeth of the fourth gear 144 moves in the tooth trace direction of the teeth as the second gear 130 and the fourth gear 144 rotate. Therefore, the lubricating oil retained in the tooth grooves between the teeth of the second gear 130 is pushed out in the tooth trace direction of the teeth as the contact point between the teeth of the second gear 130 and the teeth of the fourth gear 144 moves. In other words, the lubricating oil moves from the point where engagement starts toward the point where engagement ends.

In this way, the lubricating oil that has moved in the tooth trace direction of the teeth is then pushed out onto the guide member 143. That lubricating oil, as well as the lubricating oil picked up from the side face of the second gear 130, are then transferred to the oil reservoir 105. Therefore, the amount of lubricating oil supplied to the oil reservoir 105 is able to be increased as quickly as possible.

Fifteenth Embodiment

Figure 30:
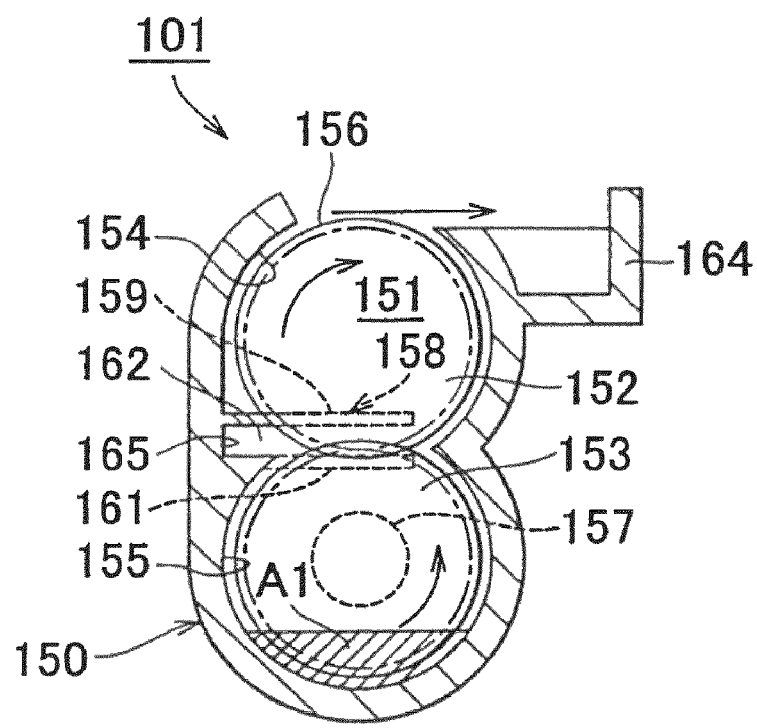
FIG. 30 is a cross-sectional view showing a fifteenth exemplary embodiment of the invention.
Figure 31:
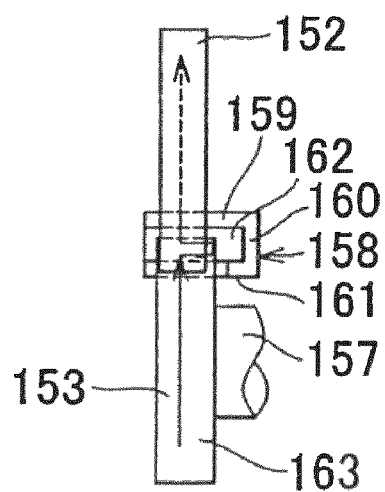
FIG. 31 is a cross-sectional view showing the fifteenth exemplary embodiment of the invention.

A fifteenth exemplary embodiment is shown in FIGS. 30 and 31. A container 150 is arranged inside a casing (not shown), and a first gear 153 and a second gear 152 are arranged in an inner portion 151 of the container 150. The second gear 152 is mounted on a first rotating shaft (not shown) and the first gear 153 is mounted on a second rotating shaft 157. The first rotating shaft and the second rotating shaft 157 both rotate around a horizontal axis. The first gear 153 and the second gear 152 are both helical gears and are engaged together. The second gear 152 is arranged above the first gear 153.

A first arc-shaped face 154 and a second arc-shaped face 155 are formed on the inner face of the container 150. The first arc-shaped face 154 is provided along the edge of the second gear 152, and the second arc-shaped face 155 is provided along the edge of the first gear 153. An opening 156 is formed above the inner portion 151 in an upper portion of the container 150. Also, a guide member 158 is formed on the inner portion 151 of the container 150. This guide member 158 has a substantially U-shaped cross section in the vertical direction. That is, the guide member 158 has an upper plate 159, a side plate 160, and a lower plate 161.

A recessed portion 162 is formed in the space surrounded by the upper plate 159, the side plate 160, and the lower plate 161. This recessed portion 162 is arranged substantially horizontal to a side of the area where the second gear 152 and the first gear 153 engage. One end portion of the recessed portion 162 in the horizontal direction is closed by a wall 165. The lower plate 161 is arranged near a side face 163 of the first gear 153. The lubricating oil sump A1 is formed in the inner portion 151 of the container 150. Furthermore, a portion of the container 150 also serves as a portion of a oil reservoir 164.

In FIG. 30, the first gear 153 rotates counterclockwise and the second gear 152 rotates clockwise. Because a lower portion of the first gear 153 is submersed in the lubricating oil sump A1, lubricating oil is kicked up by the rotation of the first gear 153. Lubricating oil adhered to the side face 163 of the first gear 153 is then picked up by the lower plate 161 and retained in the recessed portion 162.

Also, because the first gear 153 and the second gear 152 are both helical gears, the contact point between the tooth face of the teeth of the first gear 153 and the tooth face of the teeth of the second gear 152 moves in the tooth trace direction of the teeth as the first gear 153 and the second gear 152 rotate. Therefore, the lubricating oil retained in the tooth grooves between the teeth of the first gear 153 is pushed out in the tooth trace direction of the teeth as the contact point moves. In other words, the lubricating oil moves from the point where engagement starts toward the point where engagement ends.

In this way, the lubricating oil that has moved in the tooth trace direction of the teeth runs into the recessed portion 162. Because the lubricating oil that has run into the recessed portion 162 contacts the second gear 152, it moves toward the wall 165 as the second gear 152 rotates. This lubricating oil is then retained by the tooth grooves of the second gear 152 and thrown upward by centrifugal force from the rotation of the second gear 152, passing through the opening 156 so as to be supplied to the oil reservoir 164. In the exemplary embodiment shown in FIG. 28, as well, the lubricating oil is transferred to the oil reservoir 164 in two steps, the first being the transfer of the lubricating oil by rotation of the first gear 153, and the second being the transfer of the lubricating oil by rotation of the second gear 152. Accordingly, even if the first gear 153 is separated from the oil reservoir 164, a reduction in the amount of lubricating oil supplied to the oil reservoir 164 is able to be suppressed.

Also, because the lubricating oil is retained by the tooth grooves of the second gear 152, the lubricating oil retaining function of the second gear 152 is improved. Further, the recessed portion 162 is provided that temporarily retains the lubricating oil in the transfer process between the first gear 153 and the second gear 152. Accordingly, the lubricating oil is able to be transferred reliably between the first gear 153 and the second gear 152. Further, because the lubricating oil is pushed out from between the first gear 153 and the second gear 152, the ability of the lubricating oil to separate from the first gear 153 is improved. Furthermore, it is possible to suppress an increase in the surface area of the first gear 153 that is submersed in the lubricating oil sump A1. As a result, it is also possible to suppress an increase in power loss of the second rotating shaft 157.

Sixteenth Embodiment

Figure 32:
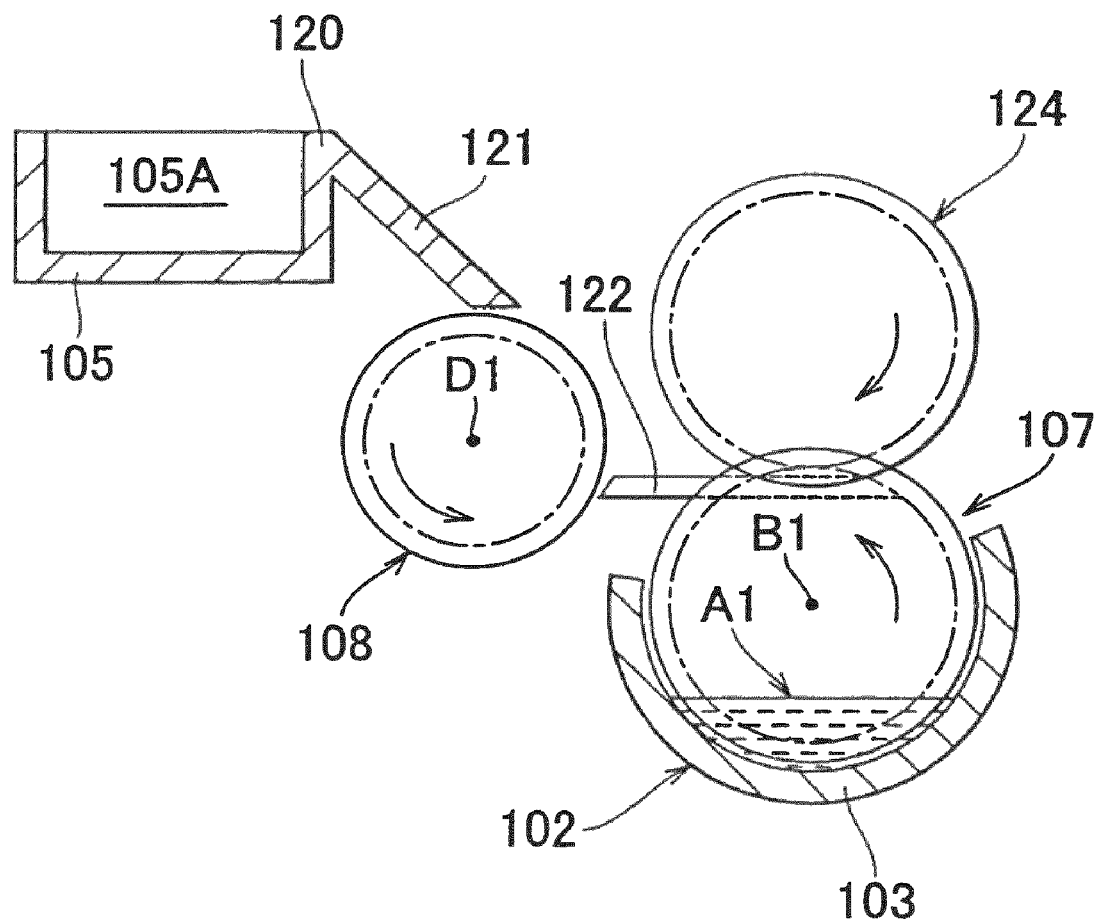
FIG. 32 is a cross-sectional view showing a sixteenth exemplary embodiment of the invention.

A sixteenth exemplary embodiment is shown in FIG. 32. The structures shown in FIG. 32 that are the same as those in FIGS. 18 and 20 shall be denoted by the same reference numerals as in FIGS. 18 and 20, and descriptions thereof will be omitted. That is, the guide member 122 is provided to the side of the side face 123 of the first gear 107. One end portion of the guide member 122 is provided along the side of the second gear 108. The teeth formed on the outer periphery of the second gear 108 have a so-called trapezoidal shape, with teeth grooves formed between adjacent teeth. The guide member 121, which is continuous from the oil reservoir 105, is formed above the second gear 108.

In FIG. 32, the directions of rotation of the first gear 107, the second gear 108, and the third gear 124 are the same as in FIG. 20. Also in FIG. 32, the lubricating oil in the lubricating oil sump A1 is transferred to the top face of the guide member 122, just as in FIG. 20. This lubricating oil runs into the tooth grooves of the second gear 108, after which it is thrown upward onto the top face of the guide member 121 by centrifugal force from the rotation of the second gear 108. The lubricating oil that has been thrown upward onto the top face of the guide member 121 then runs into the oil reservoir 105, just as in FIG. 18. The component parts in the exemplary embodiment shown in FIG. 18 that are the same as those in the exemplary embodiments shown in FIGS. 18 and 20 provide the same operation and effects obtained in the exemplary embodiments shown in FIGS. 18 and 20.

Also, in the exemplary embodiment shown in FIG. 32, there is no structure corresponding to the lubricating oil sump C1 in which the second gear 108 is submersed, nor is there a retaining portion for forming the lubricating oil sump. That is, the lubricating oil that runs along the guide member 122 runs directly into the tooth grooves of the second gear 108. The teeth on the second gear 108 have a trapezoidal shape and are few in number so the volumetric capacity of the tooth grooves is expanded. Accordingly, the amount of lubricating oil retained is able to be increased, such that the amount of lubricating oil supplied to the oil reservoir 105 is increased. Also, the number of parts that do not have a retaining portion are reduced. In the other exemplary embodiments beside that shown in FIG. 32, as well, the teeth of the gears can also be made to have a trapezoidal shape. Further, in each of the foregoing exemplary embodiments, the curve of the tooth profile of the gears may be an involute curve or a cycloid curve or the like.

The foregoing exemplary embodiment may be applied to a power transmission device arranged between a driving force source (not shown) and wheels (also not shown) of a vehicle. When this type of power transmission device for a vehicle is mounted in a vehicle, the power transmission device may be arranged within a casing. More specifically, an engine is provided as the driving force source and the casing is mounted to the outer wall of the engine. An electric motor and a generator that function as other driving force sources are arranged within this casing.

A power combining mechanism, a transmission, and differential gears are examples of power transmission devices that can be housed within the casing. Power from the engine and the electric motor may be transmitted to the transmission via the power combining mechanism. That is, the foregoing exemplary embodiments can be applied to a power train of a vehicle that is a type of a hybrid vehicle, i.e., to a vehicle having both an engine and an electric motor. Also, the lubrication systems described in the foregoing embodiments are arranged within the casing and provide lubricating oil to parts requiring lubrication without the use of an oil pump.

Further, in the exemplary embodiments described above, lubricating oil is supplied to the oil reservoir. Alternatively, however, lubricating oil can also be supplied to parts requiring lubrication, such as gear bearings, gear meshing portions, and reservoirs and the like.

In above embodiments, although a portion to which the lubricating oil supplied is referred to as the oil reservoir, the portion may be referred to as a reservoir portion or a catch tank.

The invention claimed is:

1. A planetary gearset comprising:
   a sun gear;
   a ring gear arranged on a same axis as the sun gear;
   a counter gear configured to transmit torque to said ring gear via external teeth thereof and which is arranged eccentric with respect to said sun gear and said ring gear;
   a plurality of pinion gears provided between said sun gear and said ring gear and meshing with those gears; wherein
   said pinion gears are arranged away from, in a circumferential direction, a location at which torque is transmitted between said ring gear and said counter gear; and wherein
   a carrier rotatably retains said pinion gears and is disposed so as not to rotate,
   wherein each of the pinion gears is spaced apart from a plane extending from the sun gear to the location at which torque is transmitted.

2. The planetary gearset according to claim 1, wherein the pinion gears are arranged such that the location at which torque is transmitted lies between two of the pinion gears.

3. A planetary gearset comprising:
   a sun gear;
   a ring gear arranged on a same axis as the sun gear;
   an external member configured to transmit torque between one of the sun gear and the ring gear, and the external member, and which is arranged eccentric with respect to the sun gear and the ring gear;
   a plurality of pinion gears provided between the sun gear and the ring gear, with all of the pinion gears being arranged to be concentrated in an area near, in a circumferential direction, a location at which torque is transmitted between one of the sun gear and the ring gear, and the external member and to be excluded from a plane formed between the sun gear and said location at which torque is transmitted; wherein
   a carrier rotatably retains said pinion gears and is disposed so as not to rotate.

4. The planetary gearset according to claim 3, wherein said area of concentration of the pinion gears is a same half of said carrier adjacent to said location at which torque is transmitted.

5. The planetary gearset according to claim 4, wherein said pinion gears are equidistantly distributed over an angle of 180°.

6. The planetary gearset according to claim 3, wherein the carrier is a fixed element and the ring gear is a rotating element.

7. The planetary gearset of claim 3, wherein said external member is a counter gear, said ring gear is a rotating element, and said ring gear is meshed with pinion gears.

8. The planetary gearset of claim 7, wherein external teeth of said ring gear are meshed with said counter gear.

9. The planetary gearset according to claim 6, wherein a plurality of the oil sumps are formed, and one of the plurality of oil sumps is formed with a different lubricating oil collecting capacity than another of the plurality of oil sumps.

10. The planetary gearset according to claim 1, further comprising:
   a plurality of pinion pins rotatably retained on the pinion gears by bearings, the pinion pins being fixed to the carrier;
   an oil path configured to connect axial ends of the pinion pins, from the axial end of the pinion pin on an upper level side to the axial end of the pinion pin on a lower level side in that order, the oil path being formed on the axial end side of the pinion pins so as to lead lubricating oil that runs down from above; and
   an oil sump formed in a location corresponding to the axial end of at least one of the pinion pins, and into which the lubricating oil that runs down the oil path runs, the oil sump collecting the lubricating oil, and being intercommunicated with the bearing of the at least one of the pinion pins.

11. The planetary gearset according to claim 3, further comprising:
   a plurality of pinion pins rotatably retained on the pinion gears by bearings, the pinion pins being fixed to the carrier;
   an oil path configured to connect axial ends of the pinion pins, from the axial end of the pinion pin on an upper level side to the axial end of the pinion pin on a lower level side in that order, the oil path being formed on the axial end side of the pinion pins so as to lead lubricating oil that runs down from above; and
   an oil sump formed in a location corresponding to the axial end of at least one of the pinion pins, and into which the lubricating oil that runs down the oil path runs, the oil sump collecting the lubricating oil, and being intercommunicated with the bearing of the at least one of the pinion pins.

12. The planetary gearset according to claim 1, further comprising:
   a plurality of pinion pins rotatably retained on the pinion gears by bearings, the pinion pins being fixed to the carrier;
   a plurality of oil holes extending from the axial ends of the pinion pins to the bearings;
   an oil path configured to connect open ends of the oil holes from the open end of the oil hole on an upper side to an open end of the oil hole on a lower side in that order, the oil path being formed on an axial end side to which the oil holes of the pinion pins open so as to lead lubricating oil that runs down from above; and an oil sump formed in a location corresponding to the open end of at least one of the oil holes, into which the lubricating oil that runs down the oil path runs, the oil sump collecting the lubricating oil, and being intercommunicated with the at least one of the oil holes.

13. The planetary gearset according to claim 3, further comprising:

a plurality of pinion pins rotatably retained on the pinion gears by bearings, the pinion pins being fixed to the carrier;

a plurality of oil holes extending from axial ends of the pinion pins to the bearings;

an oil path configured to connect open ends of the oil holes from the open end of the oil hole on an upper side to an open end of the oil hole on a lower side in that order, the oil path being formed on an axial end side to which the oil holes of the pinion pins open so as to lead lubricating oil that runs down from above; and an oil sump formed in a location corresponding to the open end of at least one of the oil holes, into which the lubricating oil that runs down the oil path runs, the oil sump collecting the lubricating oil, and being intercommunicated with the at least one of the oil holes.

14. The planetary gearset according to claim 1, further comprising:

a first rotating body configured to transfer lubricating oil by rotating; and a second rotating body configured to retain the lubricating oil transferred by the first rotating body and to transfer, by rotating, the lubricating oil to a portion requiring lubrication.

15. The planetary gearset according to claim 3, further comprising:

a first rotating body configured to transfer lubricating oil by rotating; and a second rotating body configured to retain the lubricating oil transferred by the first rotating body and to transfer, by rotating, the lubricating oil to a portion requiring lubrication.

16. The planetary gearset according to claim 1, wherein the pinion gears are arranged at equidistant intervals in the circumferential direction from the location at which torque is transmitted.

17. The planetary gearset according to claim 16, wherein a pinion gear is disposed with respect to the center of sun gear in a location symmetrically opposite the location at which torque is transmitted.

18. The planetary gearset according to claim 1, wherein two pinion gears of the plurality of said pinion gears are arranged at equal angles away from, in a circumferential direction, a plane extending through a center of the sun gear and the location at which torque is transmitted between said ring gear and said counter gear.

* * * * *